United States Patent
Zhao et al.

(10) Patent No.: US 11,695,968 B2
(45) Date of Patent: Jul. 4, 2023

(54) PICTURE DATA ENCODING METHOD AND APPARATUS AND PICTURE DATA DECODING METHOD AND APPARATUS

(71) Applicant: Huawei Technologies Co., Ltd., Guangdong (CN)

(72) Inventors: Yin Zhao, Hangzhou (CN); Haitao Yang, Shenzhen (CN); Shan Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/646,707

(22) Filed: Dec. 31, 2021

(65) Prior Publication Data

US 2022/0124377 A1    Apr. 21, 2022

Related U.S. Application Data

(63) Continuation of application No. 16/949,362, filed on Oct. 27, 2020, now Pat. No. 11,277,648, which is a
(Continued)

(30) Foreign Application Priority Data

Jun. 28, 2017    (CN) .......................... 201710509138.8

(51) Int. Cl.
*H04N 19/96*    (2014.01)
*H04N 19/172*    (2014.01)
*H04N 19/184*    (2014.01)

(52) U.S. Cl.
CPC ........... *H04N 19/96* (2014.11); *H04N 19/172* (2014.11); *H04N 19/184* (2014.11)

(58) Field of Classification Search
CPC ..... H04N 19/96; H04N 19/172; H04N 19/184
(Continued)

(56) References Cited

U.S. PATENT DOCUMENTS

| | | |
|---|---|---|
| 2012/0170648 A1 | 7/2012 | Chen et al. |
| 2012/0281928 A1 | 11/2012 | Cohen et al. |
| 2013/0034157 A1 | 2/2013 | Helle et al. |

FOREIGN PATENT DOCUMENTS

| | | |
|---|---|---|
| CN | 102801976 A | 11/2012 |
| CN | 102939618 A | 2/2013 |

(Continued)

OTHER PUBLICATIONS

WO 2016148513 Machine Translation (Year: 2016).*
(Continued)

*Primary Examiner* — Nguyen T Truong
(74) *Attorney, Agent, or Firm* — Womble Bond Dickinson (US) LLP

(57) ABSTRACT

Embodiments of this application disclose a decoding method includes: obtaining a bitstream including picture data; parsing the bitstream to obtain node split mode information of a first-level coding tree and node split mode information of a second-level coding tree, if the split mode corresponding to the first node is no further splitting, parsing the bitstream to obtain encoding information of the first node; and decoding and reconstructing, based on the encoding information of the first node, a coding unit corresponding to the first node, to obtain a picture corresponding to the picture data.

12 Claims, 8 Drawing Sheets

Related U.S. Application Data continuation of application No. 16/728,287, filed on Dec. 27, 2019, now Pat. No. 10,834,430, which is a continuation of application No. PCT/CN2018/078498, filed on Mar. 9, 2018.

(58) Field of Classification Search
USPC .................................................. 375/240.12
See application file for complete search history.

(56) References Cited

FOREIGN PATENT DOCUMENTS

| | | | |
|---|---|---|---|
| CN | 103299627 | A | 9/2013 |
| CN | 103414891 | A | 11/2013 |
| CN | 103503461 | A | 1/2014 |
| CN | 104853220 | A | 8/2015 |
| KR | 1020160067201 | A | 6/2016 |
| RU | 2565877 | C2 | 10/2015 |
| WO | 2010116869 | A1 | 10/2010 |
| WO | 2014078068 | A1 | 5/2014 |
| WO | 2014120369 | A1 | 8/2014 |
| WO | 2016090568 | A1 | 6/2016 |
| WO | 2016091161 | A1 | 6/2016 |
| WO | WO-2016148513 | A1 * | 9/2016 ........... H04N 19/103 |
| WO | 2017008678 | A1 | 1/2017 |
| WO | 2017088170 | A1 | 6/2017 |
| WO | 2017090967 | A1 | 6/2017 |
| WO | 2018110600 | A1 | 6/2018 |

OTHER PUBLICATIONS

Chen J et al: "Algorithm description of Joint Exploration Test Model 3 (JEM3)", Joint Video Exploration Team JVET) of ITU-T SG 16 WP 3 and ISO/IEC JTC 1/SC 29/WG 11, JVET-C1001, 3rd Meeting: Geneva, CH, May 26-Jun. 1, 2016. total 35 pages. XP030150223.
TU-T H.265, Series H: Audiovisual and Multimedia Systems Infrastructure of audiovisual services—Coding of moving video High efficiency video coding. Dec. 2016, 664 pages.
Kiang Li et al. Multi-Type-Tree, Joint Video Exploration Team (JVET) of ITU-T SG 16 WP 3 and ISO/IEC JTC 1/SC 29/I/VG 11, JVET-D0117r1, 4th Meeting: Chengdu, CN, Oct. 15-21, 2016, total 3 pages.
F. Le L annec et al., Asymmetric Coding Units in QTBT. Joint Video Exploration Team (JVET) of ITU-T SG 16 WP 3?nd ISO/IEC JTC 1/SC 29/WG 11, 4th Meeting: Chengdu, CN, Oct. 15, 2016 Oct. 21, 2016, JVET-D0064, 10 pages.

\* cited by examiner

PICTURE DATA ENCODING METHOD AND APPARATUS AND PICTURE DATA DECODING METHOD AND APPARATUS

CROSS-REFERENCE TO RELATED APPLICATIONS

This application is a continuation of U.S. patent application Ser. No. 16/949,362, filed on Oct. 27, 2020, which is a continuation of U.S. patent application No. 16/728,287, filed on Dec. 27, 2019, now U.S. Pat. No. 10,834,430, which is a continuation of International Application No. PCT/CN2018/078498, filed on Mar. 9, 2018, which claims priority to Chinese Patent Application No. 201710509138.8, filed on Jun. 28, 2017, the disclosures of which are incorporated herein by reference in their entireties.

TECHNICAL FIELD

Embodiments of this application relate to the picture processing field, and in particular, to a picture data encoding method and apparatus and a picture data decoding method and apparatus.

BACKGROUND

In the video codec standard H.265, a frame of picture is partitioned into coding tree units (Coding Tree Unit, CTU) that do not overlap each other, and each CTU is used as a root node of a quadtree (Quad-Tree, QT). Each CTU is recursively split into several leaf nodes based on a QT structure. Each node in the QT structure corresponds to one picture region. If a node is no longer split, the node is referred to as a leaf node, and a picture region corresponding to the node forms a coding unit (Coding Unit, CU). Therefore, it may be considered that H.265 is a process of splitting a CTU into a group of CUs. A split mode of splitting a CTU into a group of CUs corresponds to one coding tree (coding tree).

The joint exploration model (Joint Exploration Model, JEM) by the joint exploration team on future video coding (Joint Exploration team on Future Video Coding, JVET) proposes a QTBT split mode. To be specific, nodes in a first-level coding tree use a QT split mode, and nodes in a second-level coding tree use a binary tree (Binary Tree, BT) split mode (the BT split mode includes "horizontal binary split" and "vertical binary split"). Specifically, a CTU is first split in the QT split mode, to obtain several QT leaf nodes; and the QT leaf node may be split in the BT split mode. CU shapes are more diversified in the QTBT split mode, and this can better adapt to content of a local picture.

However, for each node, an encoder device usually needs to calculate a rate distortion cost (Rate Distortion cost, RD cost) of each split mode that can be used by the node, compare the calculated RD costs, and determine a split mode corresponding to a smallest RD cost as a split mode of the node. Therefore, for each node, the encoder device needs to calculate RD costs of a plurality of split modes, and consequently encoding complexity is relatively high.

SUMMARY

Embodiments of this application provide a picture data encoding method and apparatus and a picture data decoding method and apparatus, to resolve a problem of relatively high coding complexity.

To achieve the foregoing objective, the following technical solutions are used in the embodiments of this application.

According to a first aspect, a picture data decoding method is provided. After obtaining a bitstream including picture data, a decoder device parses the bitstream to obtain node split mode information of a first-level coding tree and node split mode information of a second-level coding tree, where the node split mode information of the second-level coding tree indicates a split mode corresponding to a first node of the second-level coding tree, the split mode corresponding to the first node is one mode in a candidate-split-mode set corresponding to the first node, the candidate-split-mode set corresponding to the first node is determined according to a first preset split condition, the first preset split condition is used to indicate whether to restrict that the first node is split in a target split mode, and the target split mode includes at least one of horizontal binary split, horizontal ternary split, vertical binary split, and vertical ternary split. If the split mode corresponding to the first node is no further splitting, the decoder device parses the bitstream to obtain encoding information of the first node, where the first node corresponds to one coding unit CU. In this way, the decoder device can decode and reconstruct the coding unit based on the encoding information of the first node to obtain a picture corresponding to the picture data. In this application, a root node of the first-level coding tree corresponds to one CTU, a leaf node of the first-level coding tree is defined by using the root node of the first-level coding tree and a node split mode corresponding to the node split mode information of the first-level coding tree, and a root node of the second-level coding tree is a leaf node of the first-level coding tree.

In this embodiment of this application, the split mode corresponding to the first node of the second-level coding tree is one of split modes determined according to the first preset split condition, the first preset split condition is used to indicate whether to restrict that the first node is split in the target split mode, and the target split mode includes at least one of the horizontal binary split, the horizontal ternary split, the vertical binary split, and the vertical ternary split. A quantity of split modes corresponding to the first node is reduced with the first preset split condition, effectively reducing decoding complexity.

Optionally, in a possible implementation of this application, the node split mode corresponding to the first-level coding tree is different from the node split mode corresponding to the second-level coding tree. The node split mode corresponding to the first-level coding tree includes quadtree split, and the node split mode corresponding to the second-level coding tree includes binary tree split and ternary tree split.

Optionally, in another possible implementation of this application, the first preset split condition includes at least one of a first preset split sub-condition, a second preset split sub-condition, a third preset split sub-condition, a fourth preset split sub-condition, a fifth preset split sub-condition, a sixth preset split sub-condition, a seventh preset split sub-condition, an eighth preset split sub-condition, and a ninth preset split sub-condition. The first preset split sub-condition is: If a width-to-height ratio of a picture region corresponding to the first node is greater than or equal to a first preset threshold, the candidate-split-mode set corresponding to the first node does not include the horizontal binary split or the horizontal ternary split. The width-to-height ratio of the picture region corresponding to the first node is a ratio of a width of the picture region corresponding to the first node to a height of the picture region corresponding to the first node. The second preset split sub-condition is:

If a height-to-width ratio of the picture region corresponding to the first node is greater than or equal to a second preset threshold, the candidate-split-mode set corresponding to the first node does not include the vertical binary split or the vertical ternary split. The height-to-width ratio of the picture region corresponding to the first node is a ratio of the height of the picture region corresponding to the first node to the width of the picture region corresponding to the first node. The third preset split sub-condition is: If a ratio of an area of the picture region corresponding to the first node to an area of a picture region corresponding to the leaf node of the first-level coding tree to which the first node belongs is less than or equal to a third preset threshold, the candidate-split-mode set corresponding to the first node does not include the horizontal binary split, the horizontal ternary split, the vertical binary split, or the vertical ternary split. The fourth preset split sub-condition is: If the split mode corresponding to the first node includes a first split mode, and decoding of a first child node of the first node is later than that of a second child node of the first node, and a split mode corresponding to the second child node is the first split mode, a candidate-split-mode set corresponding to the first child node does not include the first split mode. The first split mode is the horizontal binary split or the vertical binary split. The fifth preset split sub-condition is: If the split mode corresponding to the first node includes a second split mode, and an area of a picture region corresponding to the first child node of the first node is the smallest among areas of picture regions corresponding to three child nodes of the first node, the candidate-split-mode set corresponding to the first child node does not include the second split mode. The second split mode is the horizontal ternary split or the vertical ternary split. The sixth preset split sub-condition is: If the split mode corresponding to the first node includes the second split mode, and the area of the picture region corresponding to the first child node of the first node is the largest among the areas of the picture regions corresponding to the three child nodes of the first node, the candidate-split-mode set corresponding to the first child node does not include the second split mode. The seventh preset split sub-condition is: If a ratio of the width of the picture region corresponding to the first node to a preset side length of a minimum CU is less than or equal to a third preset threshold, the candidate-split-mode set corresponding to the first node does not include the vertical ternary split; or if a ratio of the height of the picture region corresponding to the first node to the preset side length of the minimum CU is less than or equal to the third preset threshold, the candidate-split-mode set corresponding to the first node does not include the horizontal ternary split. The eighth preset split sub-condition is: If the area of the picture region corresponding to the first node is less than or equal to a fourth preset threshold, the candidate-split-mode set corresponding to the first node does not include the horizontal binary split, the horizontal ternary split, the vertical binary split, or the vertical ternary split. The ninth preset split sub-condition is: If the split mode corresponding to the first node is the second split mode, and the area of the picture region corresponding to the first child node of the first node is the largest among the areas of the picture regions corresponding to the three child nodes of the first node, the candidate-split-mode set corresponding to the first child node does not include the first split mode. A split direction of the first split mode is the same as that of the second split mode.

Optionally, in another possible implementation of this application, the node split mode information of the second-level coding tree includes first information, second information, and third information. The first information is used to indicate whether to further split the first node, the second information is used to indicate a direction in which the first node is split, and the third information is used to indicate a mode in which the first node is split. In this scenario, the method for "parsing the bitstream to obtain node split mode information of a second-level coding tree" is as follows: The bitstream is parsed to determine, according to the first preset split condition, the candidate-split-mode set corresponding to the first node; and the bitstream is parsed based on the candidate-split-mode set corresponding to the first node, to determine the first information, the second information, and the third information.

According to a parsing method for obtaining the first information, the second information, and the third information by the decoder device based on the candidate-split-mode set corresponding to the first node, values of the first information, the second information, and the third information may be parsed out from the bitstream, or may be preset by a system.

Optionally, in another possible implementation of this application, a method for "parsing the bitstream based on the candidate-split-mode set corresponding to the first node, to determine the first information, the second information, and the third information" is specifically as follows: A first numeric value is first determined. The first numeric value is a quantity of split modes included in the candidate-split-mode set corresponding to the first node. Then the bitstream is parsed based on the first numeric value to determine the first information, the second information, and the third information.

The candidate-split-mode set corresponding to nodes of the second-level coding tree may include a maximum of 15 split modes. For several split modes in the 15 split modes, methods for obtaining the first information, the second information, and the third information are the same or similar. Therefore, the decoder device may determine the first information, the second information, and the third information based on the quantity of split modes (namely, the first numeric value) included in the candidate-split-mode set corresponding to the first node. In this way, the decoder device can determine the node split mode information of the second-level coding tree more quickly.

Optionally, in another possible implementation of this application, the node split mode corresponding to the second-level coding tree further includes the quadtree split. In this case, the method for "parsing the bitstream to obtain node split mode information of a second-level coding tree" is as follows: The bitstream is parsed to obtain the node split mode information of the second-level coding tree. The node split mode information of the second-level coding tree indicates the split mode corresponding to the first node of the second-level coding tree, the split mode corresponding to the first node is one mode in the candidate-split-mode set corresponding to the first node, the candidate-split-mode set corresponding to the first node is determined according to the first preset split condition and a second preset split condition, and the second preset split condition is used to indicate whether to restrict that the first node is split based on the quadtree split.

Optionally, in another possible implementation of this application, the second preset split condition includes at least one of a tenth preset split sub-condition and an eleventh preset split sub-condition. The tenth preset split sub-condition is as follows: If a depth of the first node in the second-level coding tree is less than a preset maximum depth in the second-level coding tree, the candidate-splitmode set corresponding to the first node does not include the quadtree split. The eleventh preset split sub-condition is: If the width-to-height ratio of the picture region corresponding to the first node is greater than or equal to a fifth preset threshold, the candidate-split-mode set corresponding to the first node does not include the quadtree split.

Optionally, in another possible implementation of this application, the node split mode information of the second-level coding tree further includes fourth information, and the fourth information is used to indicate whether to split the first node based on the quadtree split. Correspondingly, the method for "parsing the bitstream to obtain the node split mode information of the second-level coding tree" is as follows: The bitstream is parsed to determine, according to the first preset split condition and the second preset split condition, the candidate-split-mode set corresponding to the first node. The bitstream is parsed in the split mode corresponding to the first node, to determine the first information, the second information, the third information, and the fourth information.

According to a second aspect, a decoder device is provided. The decoder device includes an obtaining module, a parsing module, and a decoding and reconstructing module. The obtaining module is configured to obtain a bitstream including picture data. The parsing module is configured to: parse the bitstream obtained by the obtaining module, to obtain node split mode information of a first-level coding tree, where a root node of the first-level coding tree corresponds to one coding tree unit CTU, a leaf node of the first-level coding tree is defined by using the root node of the first-level coding tree and a node split mode corresponding to the node split mode information of the first-level coding tree; parse the bitstream to obtain node split mode information of a second-level coding tree, where the node split mode information of the second-level coding tree indicates a split mode corresponding to a first node of the second-level coding tree, the split mode corresponding to the first node is one mode in a candidate-split-mode set corresponding to the first node, and the candidate-split-mode set corresponding to the first node is determined according to a first preset split condition, the first preset split condition is used to indicate whether to restrict that the first node is split in a target split mode, the target split mode includes at least one of horizontal binary split, horizontal ternary split, vertical binary split, and vertical ternary split, and a root node of the second-level coding tree is a leaf node of the first-level coding tree; and if the split mode corresponding to the first node is no further splitting, parse the bitstream to obtain encoding information of the first node, where the first node corresponds to one coding unit CU. The decoding and reconstructing module is configured to decode and reconstruct the coding unit based on the encoding information of the first node obtained by the parsing module, to obtain a picture corresponding to the picture data.

Optionally, in a possible implementation of this application, the node split mode corresponding to the first-level coding tree is different from the node split mode corresponding to the second-level coding tree. The node split mode corresponding to the first-level coding tree includes quadtree split, and the node split mode corresponding to the second-level coding tree includes binary tree split and ternary tree split.

Optionally, in another possible implementation of this application, the node split mode corresponding to the first-level coding tree includes quadtree split, and the node split mode corresponding to the second-level coding tree includes binary tree split and ternary tree split.

Optionally, in another possible implementation of this application, the node split mode information of the second-level coding tree includes first information, second information, and third information. The first information is used to indicate whether to further split the first node, the second information is used to indicate a direction in which the first node is split, and the third information is used to indicate a mode in which the first node is split. Correspondingly, the parsing module is specifically configured to: parse the bitstream to determine, according to the first preset split condition, the candidate-split-mode set corresponding to the first node; and parse the bitstream based on the candidate-split-mode set corresponding to the first node, to determine the first information, the second information, and the third information.

Optionally, in another possible implementation of this application, the parsing module is specifically configured to: determine a first numeric value, where the first numeric value is a quantity of split modes included in the candidate-split-mode set corresponding to the first node; and parse the bitstream based on the first numeric value to determine the first information, the second information, and the third information.

Optionally, in another possible implementation of this application, the node split mode corresponding to the second-level coding tree further includes the quadtree split. Correspondingly, the parsing module is specifically configured to parse the bitstream to obtain the node split mode information of the second-level coding tree, where the node split mode information of the second-level coding tree indicates the split mode corresponding to the first node of the second-level coding tree, the split mode corresponding to the first node is one mode in the candidate-split-mode set corresponding to the first node, the candidate-split-mode set corresponding to the first node is determined according to the first preset split condition and a second preset split condition, and the second preset split condition is used to indicate whether to restrict that the first node is split based on the quadtree split.

Optionally, in another possible implementation of this application, the node split mode information of the second-level coding tree further includes fourth information, and the fourth information is used to indicate whether to split the first node based on the quadtree split. Correspondingly, the parsing module is specifically configured to: parse the bitstream to determine, according to the first preset split condition and the second preset split condition, the candidate-split-mode set corresponding to the first node; and parse the bitstream in the split mode corresponding to the first node, to determine the first information, the second information, the third information, and the fourth information.

For the first preset split condition in the second aspect, refer to the description about the first preset split condition in the first aspect. Similarly, for the second preset split condition in the second aspect, refer to the description about the second preset split condition in the first aspect.

According to a third aspect, a decoder device is provided. The decoder device includes one or more processors, a memory, and a communications interface. The memory and the communications interface are coupled to the one or more processors. The memory is configured to store computer program code. The computer program code includes an instruction. When the one or more processors execute the instruction, the decoder device performs the picture data decoding method in any one of the first aspect or the possible implementations of the first aspect.

According to a fourth aspect, a computer readable storage medium is provided. The computer readable storage medium stores an instruction. When the instruction is run on a decoder device, the decoder device is enabled to perform the picture data decoding method in any one of the first aspect or the possible implementations of the first aspect.

According to a fifth aspect, a computer program product including an instruction is provided. When the computer program product is run on a decoder device, the decoder device is enabled to perform the picture data decoding method in any one of the first aspect or the possible implementations of the first aspect.

In this application, for detailed descriptions of the second aspect, the third aspect, the fourth aspect, the fifth aspect, and the implementations of the second aspect, the third aspect, the fourth aspect, and the fifth aspect, refer to the detailed descriptions of the first aspect and the implementations of the first aspect. In addition, for beneficial effects of the second aspect, the third aspect, the fourth aspect, the fifth aspect, and the implementations of the second aspect, the third aspect, the fourth aspect, and the fifth aspect, refer to analysis of the beneficial effects of the first aspect and the implementations of the first aspect. Details are not described herein again.

In this application, the name of the foregoing decoder device does not constitute any limitation on the devices or functional modules. In an actual implementation, the devices or functional modules may appear with other names. Each device or functional module falls within the scope defined by the claims and their equivalent technologies in this application, provided that a function of the device or functional module is similar to that described in this application.

According to a sixth aspect, a picture data encoding method is provided. After determining a CTU corresponding to a to-be-encoded picture block, an encoder device splits the CTU in a node split mode corresponding to a first-level coding tree, to obtain a leaf node of the first-level coding tree. A root node of the first-level coding tree corresponds to the CTU. The encoder device determines a candidate-split-mode set corresponding to a first node of a second-level coding tree. The candidate-split-mode set corresponding to the first node meets a first preset split condition used to indicate whether to restrict that the first node is split in a target split mode, the target split mode includes at least one of horizontal binary split, horizontal ternary split, vertical binary split, and vertical ternary split, and a root node of the second-level coding tree is a leaf node of the first-level coding tree. If the candidate-split-mode set corresponding to the first node includes no further splitting, the encoder device encodes a coding unit corresponding to the first node, to obtain a coding-unit bitstream corresponding to the coding unit.

The first preset split condition in this embodiment of this application limits a split mode of a node of the second-level coding tree, greatly reducing complexity of splitting a node of a second-level coding tree and reducing coding complexity.

Optionally, in a possible implementation of this application, the node split mode corresponding to the first-level coding tree includes quadtree split, and a node split mode corresponding to the second-level coding tree includes binary tree split and ternary tree split.

Optionally, in another possible implementation of this application, the node split mode corresponding to the second-level coding tree further includes the quadtree split. In this case, the method for "determining a candidate-split-mode set corresponding to a first node of a second-level coding tree" is as follows: The candidate-split-mode set corresponding to the first node is determined. The candidate-split-mode set corresponding to the first node meets the first preset split condition and a second preset split condition, and the second preset split condition is used to indicate whether to restrict that the first node is split based on the quadtree split.

Optionally, in another possible implementation of this application, if the candidate-split-mode set corresponding to the first node includes a split mode other than no further splitting, a rate distortion cost of each of split modes available for the first node is calculated; a split mode corresponding to a smallest rate distortion cost is determined as a target split mode corresponding to the first node; and the first node is split by using the target split mode corresponding to the first node.

For the first preset split condition in the sixth aspect, refer to the description about the first preset split condition in the first aspect. Similarly, for the second preset split condition in the sixth aspect, refer to the description about the second preset split condition in the first aspect.

According to a seventh aspect, an encoder device is provided. The encoder device includes a determining module, a splitting module, and an encoding module. The determining module is configured to determine a coding tree unit CTU corresponding to a to-be-encoded picture block. The splitting module is configured to split, in a node split mode corresponding to a first-level coding tree, the CTU determined by the determining module, to obtain a leaf node of the first-level coding tree. A root node of the first-level coding tree corresponds to the CTU. The determining module is further configured to determine a candidate-split-mode set corresponding to a first node of a second-level coding tree. The candidate-split-mode set corresponding to the first node meets a first preset split condition, the first preset split condition is used to indicate whether to restrict that the first node is split in a target split mode, a root node of the second-level coding tree is a leaf node of the first-level coding tree, and the target split mode includes at least one of horizontal binary split, horizontal ternary split, vertical binary split, and vertical ternary split. The encoding module is configured to: if the candidate-split-mode set that corresponds to the first node and that is determined by the determining module includes no further splitting, encode a coding unit CU corresponding to the first node, to obtain a coding-unit bitstream corresponding to the coding unit.

Optionally, in a possible implementation of this application, the node split mode corresponding to the first-level coding tree includes quadtree split, and a node split mode corresponding to the second-level coding tree includes binary tree split and ternary tree split.

Optionally, in a possible implementation of this application, the node split mode corresponding to the second-level coding tree further includes the quadtree split. Correspondingly, the determining module is specifically configured to determine the candidate-split-mode set corresponding to the first node. The candidate-split-mode set corresponding to the first node meets the first preset split condition and a second preset split condition, and the second preset split condition is used to indicate whether to restrict that the first node is split based on the quadtree split.

Optionally, in a possible implementation of this application, the encoder device provided by this embodiment of this application further includes a calculation module. The calculation module is configured to: if the candidate-split-mode set that corresponds to the first node and that is determined by the determining module includes a split mode other than no further splitting, calculate a rate distortion cost of each of split modes available for the first node. Correspondingly, the determining module is further configured to determine a split mode corresponding to a smallest rate distortion cost as a target split mode corresponding to the first node. The splitting module is specifically configured to split the first node in the target split mode that corresponds to the first node and that is determined by the determining module.

For the first preset split condition in the seventh aspect, refer to the description about the first preset split condition in the first aspect. Similarly, for the second preset split condition in the seventh aspect, refer to the description about the second preset split condition in the first aspect.

According to an eighth aspect, an encoder device is provided. The encoder device includes one or more processors, a memory, and a communications interface. The memory and the communications interface are coupled to the one or more processors. The memory is configured to store computer program code. The computer program code includes an instruction. When the one or more processors execute the instruction, the encoder device performs the picture data encoding method in any one of the sixth aspect or the possible implementations of the sixth aspect.

According to a ninth aspect, a computer readable storage medium is provided. The computer readable storage medium stores an instruction. When the instruction is run on an encoder device, the encoder device is enabled to perform the picture data encoding method in any one of the sixth aspect or the possible implementations of the sixth aspect.

According to a tenth aspect, a computer program product including an instruction is provided. When the computer program product is run on an encoder device, the encoder device is enabled to perform the picture data encoding method in any one of the sixth aspect or the possible implementations of the sixth aspect.

For specific descriptions of the seventh aspect, the eighth aspect, the ninth aspect, the tenth aspect, and the implementations of the seventh aspect, the eighth aspect, the ninth aspect, and the tenth aspect, refer to the detailed descriptions in the seventh aspect and the implementations of the seventh aspect. In addition, for beneficial effects of the seventh aspect, the eighth aspect, the ninth aspect, the tenth aspect, and the implementations of the seventh aspect, the eighth aspect, the ninth aspect, and the tenth aspect, refer to analysis of beneficial effects of the sixth aspect and the implementations of the sixth aspect. Details are not described herein again.

In this application, the name of the encoder device does not constitute any limitation to the devices or functional modules. In an actual implementation, the devices or functional modules may appear with other names. Each device or functional module falls within the scope defined by the claims and their equivalent technologies in this application, provided that a function of the device or functional module is similar to that described in this application.

These aspects or another aspect in this application are more concise and comprehensible in the following description.

DESCRIPTION OF EMBODIMENTS

In the specification, claims, and accompanying drawings of this application, the terms such as "first", "second", "third", and "fourth" are intended to distinguish between different objects, but do not indicate a particular order.

In the embodiments of this application, the word such as "example" or "for example" is used to represent giving an example, an illustration, or a description. Any embodiment or design scheme described as "example" or "for example" in the embodiments of this application should not be interpreted as being preferable or having more advantages than another embodiment or design scheme. Exactly, the word such as "example" or "for example" is used to present a related concept in a specific manner.

For ease of understanding the embodiments of this application, related elements in the embodiments of this application are first described herein.

Figure 1:
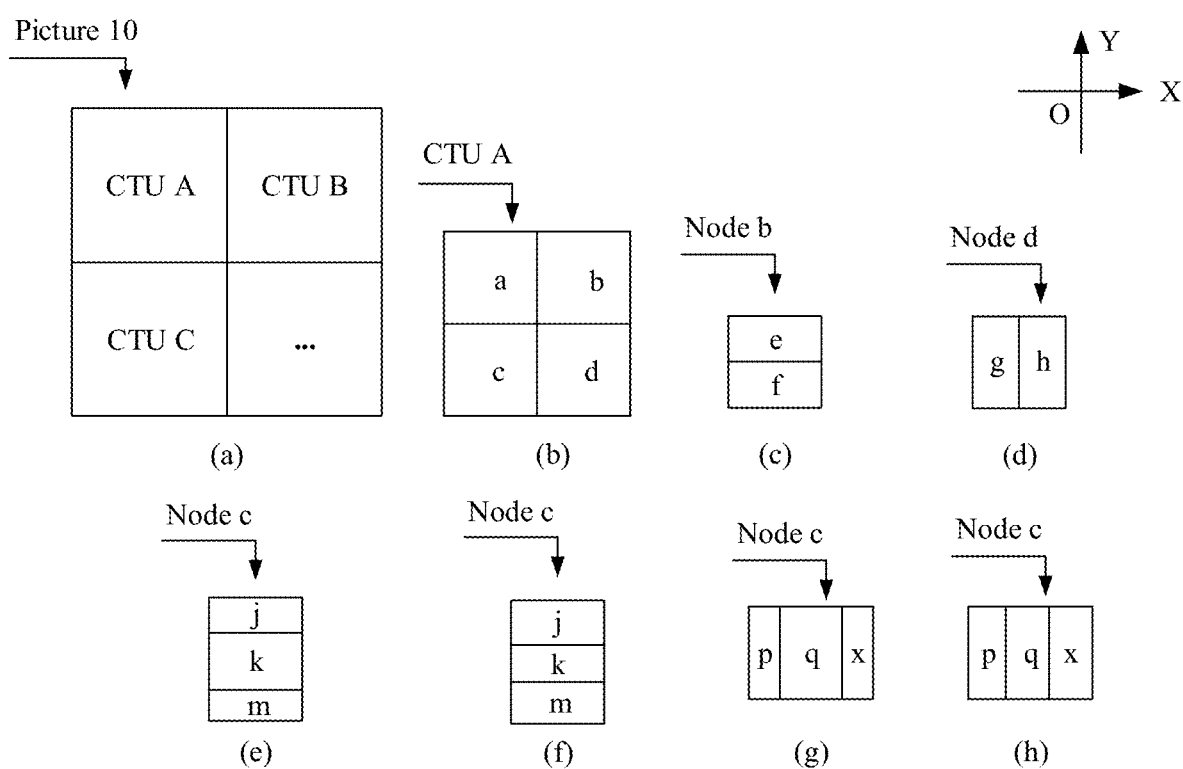
FIG. 1 is a schematic structural diagram of different split modes according to an embodiment of this application.

Coding tree unit (Coding Tree Unit, CTU): A picture includes a plurality of CTUs. A CTU usually corresponds to one square picture region. As shown in FIG. 1(*a*), a picture 10 includes a plurality of CTUs (including a CTU A, a CTU B, a CTU C, and the like). Encoding information corresponding to a CTU includes a luminance value and/or a chrominance value of a pixel in a square picture region corresponding to the CTU. In addition, the encoding information corresponding to the CTU may further include a syntax element. The syntax element indicates how to split the CTU into at least one CU and decode each CU to obtain a reconstructed picture.

A picture region corresponding to one CTU may include 64×64, 128×128, or 256×256 pixels. In an example, a CTU including 64×64 pixels includes a rectangular pixel matrix with 64 columns and 64 rows of pixels/array, and each pixel includes a luminance component and/or a chrominance component.

It may be understood that, the CTU may alternatively correspond to a rectangular picture region or a picture region in another shape, and a picture region corresponding to one CTU may alternatively be a picture region in which a quantity of pixels in a horizontal direction is different from a quantity of pixels in a vertical direction, for example, includes 64×128 pixels.

Coding unit (Coding Unit, CU): The coding unit usually corresponds to one A×B rectangular region, where A is a width of the rectangle, and B is a height of the rectangle. The width in the embodiments of this application is a length in an X-axis direction (a horizontal direction) in a two-dimensional rectangular coordinate system XoY shown in FIG. 1, and the height is a length in a Y-axis direction (a vertical direction) in the two-dimensional rectangular coordinate system XoY shown in FIG. 1. Herein, values of A and B may be the same, or may be different. The values of A and B are usually integer powers of 2, such as 256, 128, 64, 32, 16, 8, or 4. A reconstructed picture block of an AxB rectangular region may be obtained through decoding processing of a CU. The decoding processing usually includes processing such as prediction (prediction), dequantization (dequantization), and inverse transform (inverse transform), a predicted picture and a residual are generated, and the predicted picture and the residual are superposed to obtain a reconstructed picture block. A final reconstructed picture may be obtained by using a plurality of reconstructed picture blocks.

Quadtree (Quad-Tree, QT): The quadtree is a tree-like structure, and a node may be split into four child nodes. In an example, in the video codec standard H.265, a quadtree-based CTU split mode is used: A CTU is used as a root node. Each node corresponds to one square picture region. A node may not be further split (in this case, a square picture region corresponding to the node is a CU); or may be split into four lower-level nodes, that is, a square picture region corresponding to the node is split into four identical square regions (a width and a height of the square region are respectively half a width and half a height of the region before splitting), and each region corresponds to one node. As shown in FIG. 1(b), the CTU A is a root node, and the CTU A is split into four nodes: a, b, c, and d. If the node a is no longer split, a square picture region corresponding to the node a corresponds to one CU.

Binary tree (Binary Tree, BT): The binary tree is a tree-like structure. A node may be split into two child nodes. A node in a binary-tree structure may not be further split, or may be split into two lower-level nodes. A binary-tree split mode may include one of the following:

(1) Horizontal Binary Split

A picture region corresponding to a node is split into an upper region and a lower region that have a same size. To be specific, for a picture region obtained through splitting, a width remains unchanged, and a height becomes half that of the split picture region. Each picture region obtained through splitting corresponds to one child node. As shown in FIG. 1(c), the node b is split in the horizontal binary tree split mode to generate a node e and a node f (2) Vertical Binary Split A region corresponding to a node is split into a left region and a right region that have a same size. To be specific, for a picture region obtained through splitting, a height remains unchanged, and a width is half that of the split picture region. Each picture region obtained through splitting corresponds to one child node. As shown in FIG. 1(d), the node d is split in the vertical binary split mode, to generate a node g and a node h.

It may be understood that, the horizontal binary split and the vertical binary split are examples of the binary-tree split mode. The picture region corresponding to the node may be split into two subregions in another mode. For example, two regions unequal in height are obtained through horizontal splitting, or two regions unequal in width are obtained through vertical splitting.

Ternary tree (Ternary Tree, TT): The ternary tree is a tree-like structure. A node may be split into three child nodes. A node in a ternary tree structure may not be further split, or may be split into three lower-level nodes. A ternary tree split mode may include one of the following:

(1) Horizontal Ternary Split

A picture region corresponding to a node is split into three regions: an upper region, a middle region, and a lower region, and each region corresponds to one child node. In an example, heights of the upper region, the middle region, and the lower region are respectively $\frac{1}{4}$, $\frac{1}{2}$, and $\frac{1}{4}$ of a height of the picture region before splitting. As shown in FIG. 1(e), the node c is split in the horizontal ternary split mode, to generate a node j, a node k, and a node m. A height of a picture region corresponding to the node j is $\frac{1}{4}$ of the height of the picture region corresponding to the node c, a height of a picture region corresponding the node k is $\frac{1}{2}$ of the height of the picture region corresponding to the node c, and a height of a picture region corresponding to the node m is $\frac{1}{4}$ of the height of the picture region corresponding to the node c. In another example, heights of the upper region, the middle region, and the lower region are respectively $\frac{1}{3}$, $\frac{1}{3}$, and $\frac{1}{3}$ of a height of the picture region before splitting. To be specific, the picture region corresponding to the node is evenly split into three regions in the X-axis direction in the two-dimensional rectangular coordinate system XoY shown in FIG. 1. As shown in FIG. 1(f), the node c is split in the horizontal ternary split mode, to generate a node j, a node k, and a node m; and a height of a picture region corresponding to the node j, a height of a picture region corresponding the node k, and a height of a picture region corresponding to the node m are all $\frac{1}{3}$ of the height of the picture region corresponding to the node c.

(2) Vertical Ternary Split

A picture region corresponding to a node is split into three regions: a left region, a middle region, and a right region, and each region corresponds to one child node. In an example, widths of the left region, the middle region, and the right region are respectively $\frac{1}{4}$, $\frac{1}{2}$, and $\frac{1}{4}$ of a width of the picture region before splitting. As shown in FIG. 1(g), the node c is split in the vertical ternary split mode, to generate a node p, a node q, and a node x. A width of a picture region corresponding to the node p is $\frac{1}{4}$ of the width of the picture region corresponding to the node c, a width of a picture region corresponding the node q is $\frac{1}{2}$ of the width of the picture region corresponding to the node c, and a width of a picture region corresponding to the node x is $\frac{1}{4}$ of the width of the picture region corresponding to the node c. In another example, widths of the left region, the middle region, and the right region are respectively $\frac{1}{3}$, $\frac{1}{3}$, and $\frac{1}{3}$ of a width of the picture region before splitting. To be specific, the picture region corresponding to the node is evenly split into three regions in the Y-axis direction in the two-dimensional rectangular coordinate system XoY shown in FIG. 1. As shown in FIG. 1(h), the node c is split in the vertical ternary split mode, to generate a node p, a node q, and a node x; and a width of a picture region corresponding to the node p, a width of a picture region corresponding the node q, and a width of a picture region corresponding to the node x are all $\frac{1}{3}$ of the width of the picture region corresponding to the node c.

Image encoding (image encoding): The image encoding is a processing process in which a picture sequence is compressed into a bitstream.

Image decoding (image decoding): The image decoding is a processing process in which a bitstream is restored to a reconstructed picture according to a specific syntax rule and a specific processing method.

In the video codec standard H.265, a CTU is split in a QT split mode. Specifically, the CTU is used as a root (root)

node of a QT structure, and the CTU is recursively split into several leaf nodes (leaf node) in the QT split mode. If a node is no longer split, the node is referred to as a leaf node. It can be learned from the foregoing description that a picture includes a plurality of CTUs, and one CTU corresponds to one square picture region. In other words, one CTU corresponds to one picture block. Each leaf node corresponds to one CU. Each CU is equivalent to a child picture block in a picture bock corresponding to a CTU, and the child picture block can be no longer split in the QT split mode. If a node needs to be further split, a picture region corresponding to the node is split into four picture regions of a same size. Refer to FIG. 1(b), after the picture region corresponding to the node is split, each picture region generated after splitting corresponds to one node, and whether these nodes are to be further split needs to be further determined. Whether to split a node is defined by a split flag bit (for example, split_cu_flag), corresponding to the node, in a bitstream. A depth of a root node in a QT structure (QT depth for short) is 0, and a QT depth of a child node generated in a QT split mode is a QT depth of a parent node of the child node plus 1.

Figure 2:
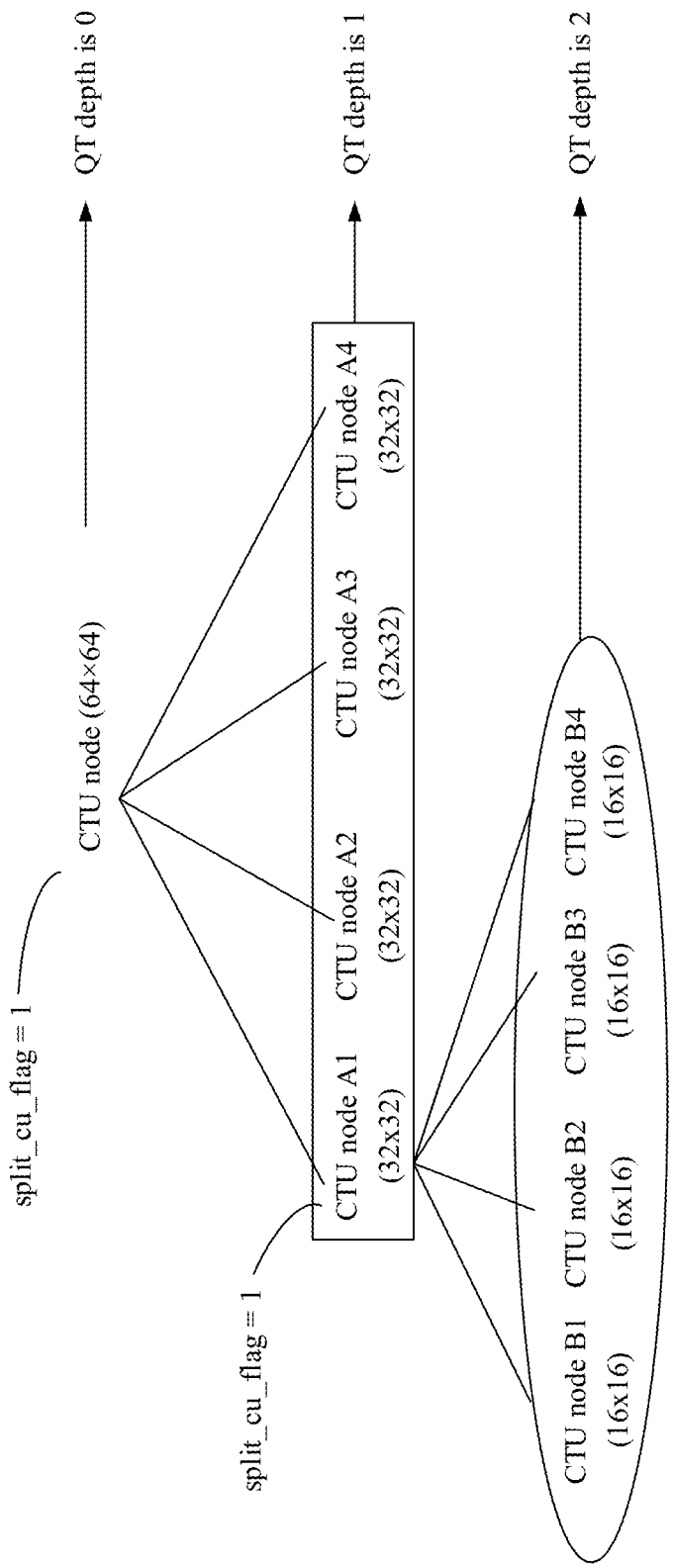
FIG. 2 is a schematic structural diagram of a depth of a quadtree according to an embodiment of this application.

For example, a split flag bit of a node is represented by split_cu_flag. If split_cu_flag=0, it indicates that the node is no longer split; or if split_cu_flag=1, it indicates that the node is to be further split. As shown in FIG. 2, when a value of split_cu_flag of a 64×64 CTU node (whose QT depth is 0) is 1, the CTU node is split into four 32×32 nodes (whose QT depths are 1), and the four 32×32 nodes are respectively a node A1, a node A2, a node A3, and a node A4. Each of the four 32×32 nodes may be or may not be split based on split_cu_flag corresponding to the node. If a value of split_cu_flag of the node A1 is 1, the node A1 is further split into four 16×16 nodes (whose QT depths are 2), the four 16×16 nodes are respectively a node B1, a node B2, a node B3, and a node B4, and so on until no node is further split. In this way, one CTU is split into a group of CUs. In a same QT structure, minimum sizes of all CUs (namely, minimum values of the CUs) are the same, and the minimum sizes of the CUs are identified in a sequence parameter set (Sequence Parameter Set, SPS) of the bitstream. For example, an 8×8 CU is a minimum CU. In the foregoing recursive split process, if a size of a node is equal to the minimum size of the CU, it is determined that the node is no longer split, and a split flag of the node does not need to be included in the bitstream either.

Figure 3:
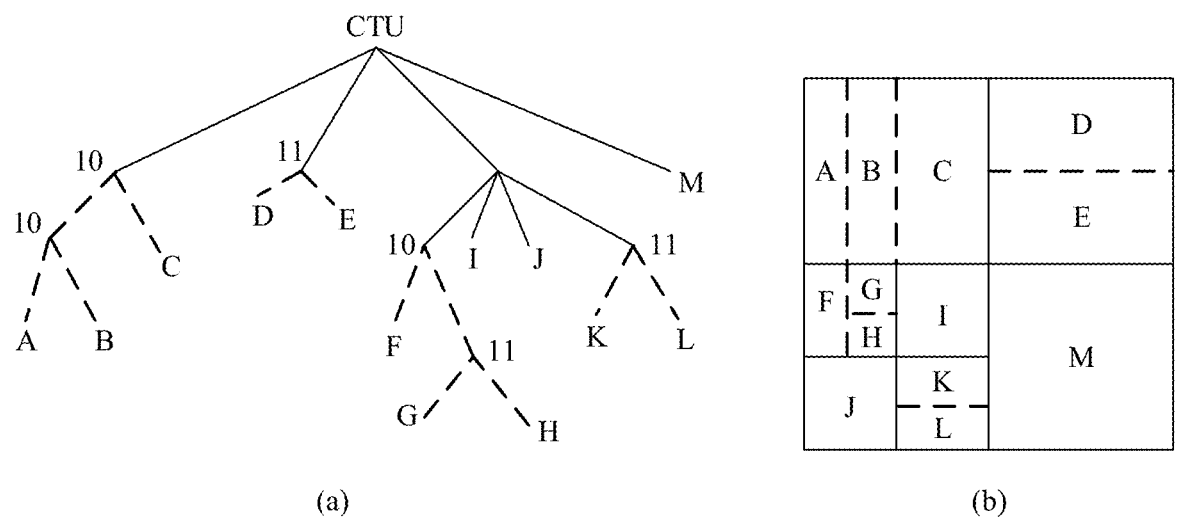
FIG. 3 is a schematic diagram of combined division of quadtree division and binary tree division according to an embodiment of this application.

A split mode in which a CTU is split into a group of CUs corresponds to one coding tree. FIG. 3(a) is an example of a coding tree. A coding tree may correspond to only one split mode, for example, a quadtree split mode, or may correspond to a plurality of split modes, for example, the foregoing QTBT structure and a QT-BT/TT structure described below.

A first-level coding tree, a second-level coding tree, a third-level coding tree, . . . , and an $N^{th}$-level coding tree correspond to different split mode sets, where N is a positive integer greater than 3. The different split mode sets may be a type of tree, for example, a ternary tree, a binary tree, or a quadtree; or may be a set of split modes in a same type of tree, for example, horizontal binary split or vertical binary split; or may be a combination thereof. It may be understood that a coding tree does not necessarily include all the foregoing plurality of coding trees at different levels. For example, a coding tree may include only the first-level coding tree; or a coding tree may include the first-level coding tree and the second-level coding tree; or a coding tree may include the first-level coding tree, the second-level coding tree, and the third-level coding tree.

In an example, the first-level coding tree may include quadtree split, and the second-level coding tree may include binary tree split and ternary tree split.

In an example, the first-level coding tree may include quadtree split, and the second-level coding tree may include binary tree split, ternary tree split, and quadtree split.

In an example, the first-level coding tree may include quadtree split and binary tree split, and the second-level coding tree includes ternary tree split.

In an example, the first-level coding tree may include quadtree split, the second-level coding tree may include binary tree split, and the third-level coding tree may include ternary tree split.

In an example, the first-level coding tree may include horizontal binary split, the second-level coding tree may include vertical binary split and quadtree split, and the third-level coding tree may include vertical ternary split and horizontal ternary split.

The second-level coding tree may further include other split modes, and this is not specifically limited in the embodiments of this application.

An encoder device usually uses a rate distortion optimization (Rate Distortion Optimization, RDO) technology to determine a specific coding tree used by a CTU for encoding. Specifically, for each node, the encoder device calculates a rate distortion cost (Rate Distortion cost, RD cost) of each split mode that can be used by the node, compares calculated RD costs, and determines a split mode corresponding to a minimum RD cost as a split mode of the node.

Similar to that in the QT structure, a depth of a node in a BT structure is referred to as a BT depth, and a BT depth of a child node generated in a BT split mode is a BT depth of a parent node of the child node plus 1. If a BT depth of a node is equal to a maximum BT depth, it is determined that the node is no longer split. The maximum BT depth in the BT structure is usually identified in the SPS.

In an example, the BT split mode is introduced in addition to the QT split mode. The QT split mode and the BT split mode are cascaded to obtain a split mode. This split mode is referred to as a QTBT split mode. Specifically, a CTU is split in the QT split mode, and a QT leaf node can be further split in the BT split mode. In other words, the first-level coding tree is a QT, and the second-level coding tree is a BT.

As shown in FIG. 3(a), each endpoint represents a node, a solid line represents that a node is split in the QT split mode, a dashed line represents that a node is split in the BT split mode, A to M are 13 leaf nodes, and each leaf node corresponds to one CU. In the BT structure, 10 represents vertical binary split, and 11 represents horizontal binary split. FIG. 3(b) shows a picture region corresponding to a CTU that is split in the split mode shown in FIG. 3(a).

In the QTBT split mode, each CU has a QT depth and a BT depth. For a CU in the QTBT split mode, a QT depth of the CU is a QT depth of a QT leaf node to which the CU belongs, and a BT depth of the CU is a BT depth of a BT leaf node to which the CU belongs. If a CTU is not split, that is, there is only one CU, a QT depth of the CU is 0, and a BT depth of the CU is 0.

For example, in FIG. 3(a), QT depths of A and B are 1, and BT depths of A and B are 2; QT depths of C, D, and E are 1, and BT depths of C, D, and E are 1; QT depths of F, K, and L are 2, and BT depths of F, K, and L are 1; QT depths of I and J are 2, and BT depths of I and J are 0; QT depths of G and H are 2, and BT depths of G and H are 2; and a QT depth of M is 1, and a BT depth of M is 0.

CU shapes in the QTBT split mode are more diversified, and this can better adapt to content of a local picture. In the standard H.265, all CUs obtained through splitting based on the QT split mode can only be squares, that is, a width (width) of the CU is equal to a height (height) of the CU. After the BT split mode is introduced in addition to the QT split mode, a width and a height of a CU may be different from each other. For example, a width-to-height ratio (a numeric value of the width-to-height ratio is equal to a width divided by a height) is 2, 4, 8, 16, ½, ¼, ⅛, or ⅟₁₆. Certainly, in the QTBT split mode, neither the width nor the height of each CU can be less than a side length of a minimum CU (for example, the minimum CU may be set to 4×4). An SPS of a video stream usually includes size information of a minimum CU.

In addition to the QTBT, a QT-BT/TT split mode may be further included. To be specific, a node of the first-level coding tree uses the QT split mode, and a node of the second-level coding tree may use the BT split mode or the TT split mode. Specifically, a CTU is a root node of the first-level coding tree, and the CTU is split in the QT split mode to generate several leaf nodes of the first-level coding tree. Then, the leaf node of the first-level coding tree is used as a root node of the second-level coding tree, and a node of the second-level coding tree is split in the BT split mode (including horizontal binary split and vertical binary split) or the TT split mode (including horizontal ternary split and vertical ternary split), to generate several leaf nodes of the second-level coding tree.

However, for each node, the encoder device usually needs to calculate an RD cost of each split mode that can be used by the node, compare calculated RD costs, and determine a split mode corresponding to a minimum RD cost as a split mode of the node. In the QT-BT/TT split mode, because the BT split mode or the TT split mode may be used for the node of the second-level coding tree, for each node of the second-level coding tree, the encoder device needs to calculate RD costs of the four split modes (horizontal binary split, vertical binary split, horizontal ternary split, and vertical ternary split) to determine a split mode actually used by the node of the second-level coding tree. Consequently, encoding complexity is relatively high.

In view of the foregoing problem, an embodiment of this application provides a picture data decoding method. After obtaining a bitstream including picture data, a decoder device parses the bitstream to obtain node split mode information of a first-level coding tree and node split mode information of a second-level coding tree. The node split mode information of the second-level coding tree indicates a split mode corresponding to a first node of the second-level coding tree, the split mode corresponding to the first node is one mode in a candidate-split-mode set corresponding to the first node, the candidate-split-mode set corresponding to the first node is determined according to a first preset split condition, the first preset split condition is used to indicate whether to restrict that the first node is split in a target split mode, and the target split mode includes at least one of horizontal binary split, horizontal ternary split, vertical binary split, and vertical ternary split. If the split mode corresponding to the first node is no further splitting, the decoder device parses the bitstream to obtain encoding information of the first node. The first node corresponds to one coding unit CU. In this way, the decoder device can decode and reconstruct the coding unit based on the encoding information of the first node to obtain a picture corresponding to the picture data. In this application, a root node of the first-level coding tree corresponds to a CTU, a leaf node of the first-level coding tree is defined by using the root node of the first-level coding tree and a node split mode corresponding to the node split mode information of the first-level coding tree, and a root node of the second-level coding tree is a leaf node of the first-level coding tree. In this embodiment of this application, the split mode corresponding to the first node of the second-level coding tree is one of split modes determined according to the first preset split condition, the first preset split condition is used to indicate whether to restrict that the first node is split in the target split mode, and the target split mode includes at least one of the horizontal binary split, the horizontal ternary split, the vertical binary split, and the vertical ternary split. A quantity of split modes corresponding to the first node is reduced with the first preset split condition, effectively reducing decoding complexity.

Correspondingly, an embodiment of this application further provides a picture data encoding method. After determining a CTU corresponding to a to-be-encoded picture block, an encoder device splits the CTU in a node split mode corresponding to a first-level coding tree, to obtain a leaf node of the first-level coding tree. A root node of the first-level coding tree corresponds to the CTU. The encoder device determines a candidate-split-mode set corresponding to a first node of a second-level coding tree. The candidate-split-mode set corresponding to the first node meets a first preset split condition used to indicate whether to restrict that the first node is split in a target split mode, the target split mode includes at least one of horizontal binary split, horizontal ternary split, vertical binary split, and vertical ternary split, and a root node of the second-level coding tree is a leaf node of the first-level coding tree. If the candidate-split-mode set corresponding to the first node includes no further splitting, the encoder device encodes a coding unit corresponding to the first node, to obtain a coding-unit bitstream corresponding to the coding unit. The first preset split condition in this embodiment of this application limits a split mode of a node of the second-level coding tree, greatly reducing complexity of splitting a node of a second-level coding tree and reducing coding complexity.

Figure 4:
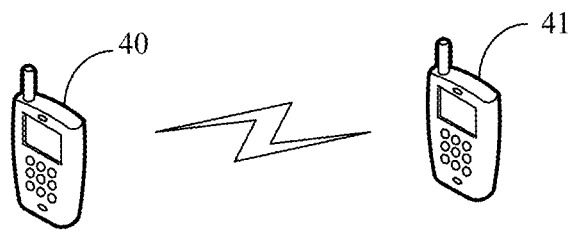
FIG. 4 is a schematic structural diagram of a picture processing system according to an embodiment of this application.

The picture data encoding method and the picture data decoding method provided by the embodiments of this application are both applicable to a picture processing system. FIG. 4 is a schematic structural diagram of a picture processing system according to an embodiment of this application. As shown in FIG. 4, the picture processing system includes an encoder device 40 and a decoder device 41. The encoder device 40 and the decoder device 41 may be disposed separately, or may be integrated into one device. This is not specifically limited in this embodiment of this application. For example, in FIG. 1, the encoder device 40 and the decoder device 41 are disposed separately. For ease of description, description is provided in the following by using an example in which the encoder device and the decoder device are disposed separately.

Specifically, after capturing a video, the encoder device 40 processes, in a split mode of a first-level coding tree and a split mode of a second-level coding tree, a CTU corresponding to each picture in the video. If a candidate-split-mode set corresponding to a first node of the second-level coding tree includes no further splitting, the encoder device 40 encodes a coding unit corresponding to the first node to obtain a coding-unit bitstream corresponding to the coding unit. After obtaining the coding-unit bitstream corresponding to each node of the second-level coding tree, the encoder device 40 obtains a CTU bitstream, and sends the CTU bitstream to the decoder device 41. The decoder device 41 parses the CTU bitstream obtained by the decoder device 41, to obtain node split mode information of the second-level coding tree, and performs corresponding processing based on the node split mode information of the second-level coding tree to obtain a reconstructed picture.

Both the encoder device 40 and the decoder device 41 may be various devices with a camera (for example, a front-facing camera or a rear-facing camera). For example, the encoder device and the decoder device may be wearable electronic devices (for example, smartwatches) or instant cameras; or may be mobile phones shown in FIG. 5; or may be tablet computers, desktop computers, virtual reality apparatuses, notebook computers, ultra-mobile personal computers (Ultra-mobile Personal Computer, UMPC), personal digital assistants (Personal Digital Assistant, PDA), or the like. Specific forms of the encoder device 40 and the decoder device 41 are not specifically limited in this embodiment of this application.

Figure 5:
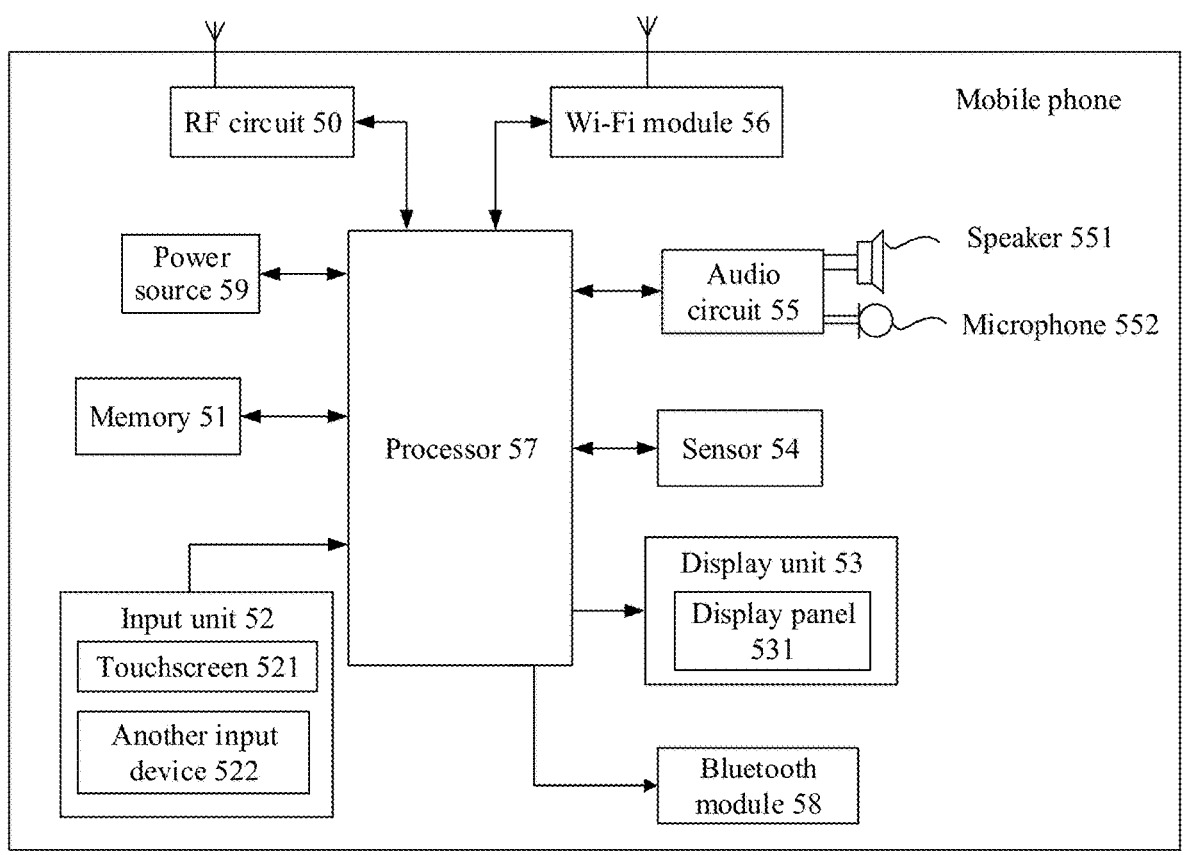
FIG. 5 is a schematic diagram of a hardware structure of a mobile phone according to an embodiment of this application.

With reference to FIG. 4, as shown in FIG. 5, both the encoder device 40 and the decoder device 41 in this embodiment may be mobile phones. The following specifically describes this embodiment by using a mobile phone as an example.

It should be understood that the mobile phone shown in FIG. 5 is merely an example of the encoder device 40 and the decoder device 41, and the mobile phone may include more or fewer components than components shown in FIG. 5, may combine two or more components, or may have different component configurations. The components shown in FIG. 5 may be implemented in hardware including one or more signal processor and/or application-specific integrated circuits, software, or a combination of hardware and software.

As shown in FIG. 5, the mobile phone includes components such as an RF (Radio Frequency, radio frequency) circuit 50, a memory 51, an input unit 52, a display unit 53, a sensor 54, an audio circuit 55, a wireless fidelity (Wireless Fidelity, Wi-Fi) module 56, a processor 57, a Bluetooth module 58, and a power source 59. A person skilled in the art may understand that a structure of the mobile phone shown in FIG. 5 does not constitute a limitation on the mobile phone, and the mobile phone may include more or fewer components than those shown in FIG. 5, may combine some components, or may have different component arrangements.

The following specifically describes the constituent components of the mobile phone with reference to FIG. 5.

The RF circuit 50 may be configured to send and receive signals in an information sending and receiving process or a call process. The RF circuit 310 may receive downlink information from a base station, and then transmit the downlink information to the processor 57 for processing; and send uplink data to the base station. The RF circuit usually includes but is not limited to devices such as an antenna, at least one amplifier, a transceiver, a coupler, a low noise amplifier, and a duplexer. In addition, the RF circuit 50 may further communicate with a network and another mobile device through wireless communication. The wireless communication may use any communications standard or protocol, including but not limited to a global system for mobile communications, a general packet radio service, code division multiple access, wideband code division multiple access, long term evolution, an email, a short message service, and the like.

The memory 51 may be configured to store a software program and data. The processor 57 runs the software program and the data stored in the memory 51, to perform various functions of the mobile phone 110 and process data. The memory 51 may mainly include a program storage area and a data storage area. The program storage area may store an operating system, an application program required by at least one function (such as an audio playing function and a picture playing function), and the like. The data storage area may store data (such as audio data, a phone book, and a video) that is created according to use of the mobile phone, and the like. In addition, the memory 51 may include a high-speed random access memory, and may further include a non-volatile memory, for example, at least one magnetic disk storage device, a flash memory device, or another volatile solid-state storage device. In the following embodiments, the memory 51 stores an operating system that enables the mobile phone to be run, for example, an iOS® operating system developed by Apple, an Android® open-source operating system developed by Google, and a Windows® operating system developed by Microsoft.

The input unit 52 (for example, a touchscreen) may be configured to receive input digit or character information, and generate a signal input related to a user setting and function control of the mobile phone. Specifically, the input unit 52 may include a touchscreen 521 and another input device 522. The touchscreen 521, also referred to as a touch panel, may collect a touch operation performed by a user on or near the touchscreen 521 (for example, an operation performed on or near the touchscreen 521 by the user by using any suitable object or accessory such as a finger or a stylus), and drive a corresponding connection apparatus according to a preset program. Optionally, the touchscreen 521 may include two components: a touch detection apparatus and a touch controller (which are not shown in FIG. 5). The touch detection apparatus detects a touch position of the user, detects a signal generated by the touch operation, and transfers the signal to the touch controller. The touch controller receives touch information from the touch detection apparatus, converts the touch information into contact coordinates, sends the contact coordinates to the processor 57, and can receive and execute an instruction sent by the processor 57. In addition, the touchscreen 521 may be implemented in various types such as a resistive type, a capacitive type, an infrared type, and a surface acoustic wave type.

The display unit 53 (namely, a display screen) may be configured to display information input by the user or information provided to the user, and a graphical user interface (Graphical User Interface, GUI) of various menus of the mobile phone. The display unit 53 may include a display panel 531 disposed on the front side of the mobile phone. Optionally, the display panel 531 may be configured in a form such as a liquid crystal display (Liquid Crystal Display, LCD) or an organic light-emitting diode (Organic Light-emitting Diode, OLED). Further, the touchscreen 521 may cover the display panel 531. After detecting a touch operation on or near the touchscreen 521, the touchscreen 131 transfers the touch operation to the processor 57 to determine a touch event type. Then the processor 57 provides a corresponding visual output on the display panel 531 based on the touch event type. In FIG. 5, the touchscreen 521 and the display panel 531 are used as separate components to implement input and output functions of the mobile phone. However, in some embodiments, the touchscreen 521 and the display panel 531 may be integrated to implement the input and output functions of the mobile phone.

In other embodiments, a pressure sensor may also be configured on the touchscreen 521. In this way, when the user performs a touch operation on the touchscreen, the touchscreen can further detect pressure brought by the touch operation, so that the mobile phone can detect the touch operation more accurately.

The mobile phone may further include at least one sensor 54, for example, a light sensor, a motion sensor, and other sensors. Specifically, the optical sensor may include an ambient light sensor and a proximity sensor. The ambient light sensor may adjust luminance of the display panel 531 based on brightness of ambient light. The proximity sensor is disposed on the front side of the mobile phone. When the mobile phone moves to an ear, the mobile phone turns off the power supply of the display panel 531 based on detection of the proximity sensor, so that the mobile phone can further save power. As a motion sensor, an accelerometer sensor may detect acceleration magnitudes in all directions (usually on three axes), may detect a magnitude and a direction of gravity when the accelerometer sensor is stationary, and may be configured to recognize mobile phone posture application (for example, screen switching between landscape and portrait modes, a related game, and magnetometer posture calibration), a function related to vibration recognition (such as a pedometer or a knock), and the like. Other sensors may be further configured for the mobile phone, such as a gyroscope, a barometer, a hygrometer, a thermometer, and an infrared sensor. Details are not described herein.

The audio circuit 55, a speaker 551, and a microphone 552 may provide an audio interface between the user and the mobile phone. The audio circuit 55 may transmit, to the speaker 551, an electrical signal converted from received audio data, and the speaker 551 converts the electrical signal into a sound signal for output. In addition, the microphone 552 converts a collected sound signal into an electrical signal, and the audio circuit 55 converts the electrical signal into audio data after receiving the electrical signal, and then outputs the audio data to the RF circuit 50 to send the audio data to, for example, another mobile phone, or outputs the audio data to the memory 51 for further processing.

Wi-Fi is a short-distance wireless transmission technology. By using the Wi-Fi module 56, the mobile phone may help the user send and receive e-mails, browse web pages, access streaming media, and so on. Wi-Fi provides wireless broadband Internet access for the user.

The processor 57 is a control center of the mobile phone 110, and is connected to the components of the entire mobile phone by using various interfaces and lines. By running or executing the software program stored in the memory 51, and invoking the data stored in the memory 51, the processor 57 performs various functions of the mobile phone and processes data, to perform overall monitoring on the mobile phone. In some embodiments, the processor 57 may include one or more processing units. The processor 57 may further integrate an application processor and a modem processor. The application processor mainly processes an operating system, a user interface, an application program, and the like. The modem processor mainly processes wireless communication. It may be understood that, the modem processor may also be disposed separately.

The Bluetooth module 58 is configured to exchange information with another device by using a short-range communications protocol such as Bluetooth. For example, the mobile phone may establish, by using the Bluetooth module 58, a Bluetooth connection to a wearable electronic device (for example, a smartwatch) that also has a Bluetooth module, to exchange data.

The mobile phone further includes the power source 59 (for example, a battery) that supplies power to the components. The power source may be logically connected to the processor 57 by using a power management system, to implement functions such as charge and discharge management and power consumption management by using the power management system.

With reference to specific embodiments, the following describes in detail a picture data encoding method and a picture data decoding method according to the embodiments of this application.

Figure 6:
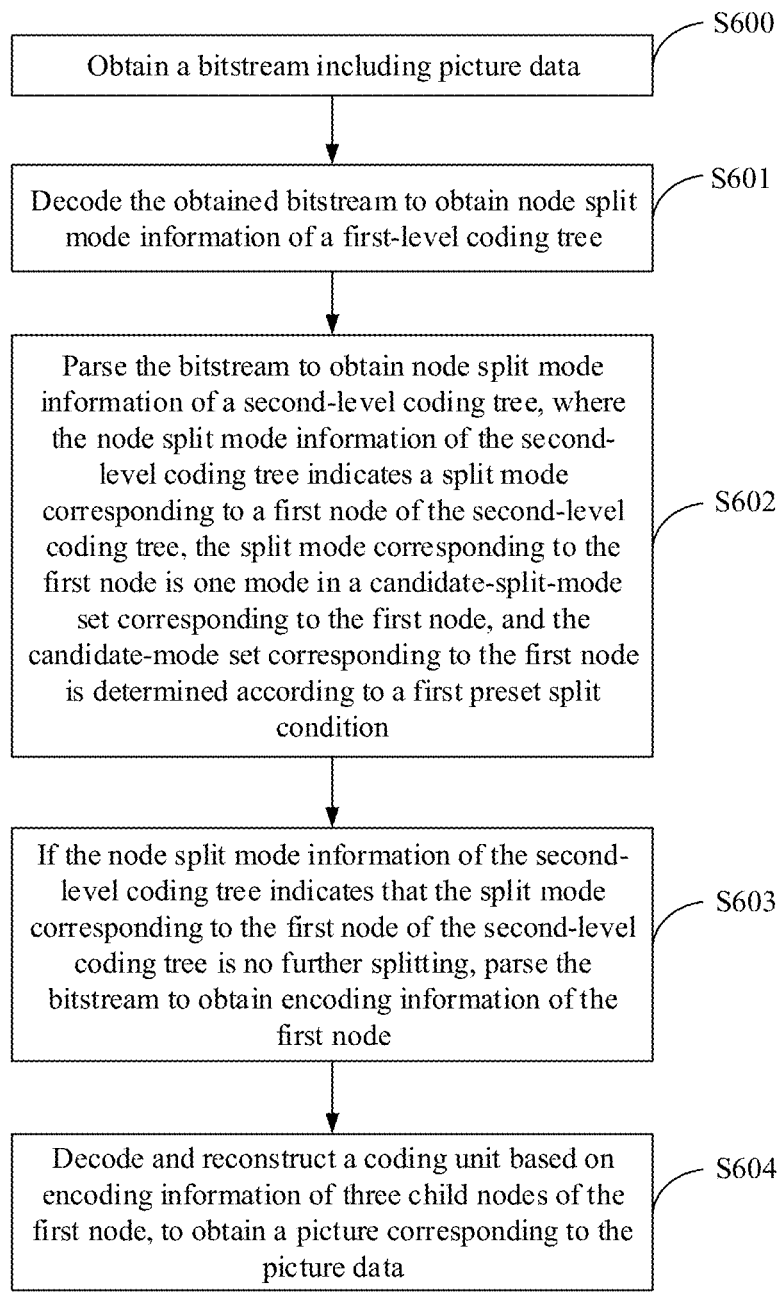
FIG. 6 is a first schematic flowchart of a picture data decoding method according to an embodiment of this application.

FIG. 6 is a schematic flowchart of a picture data decoding method according to an embodiment of this application. The decoding method may be applied to the picture processing system shown in FIG. 4.

As shown in FIG. 6, the picture data decoding method includes the following steps.

S600. A decoder device obtains a bitstream including picture data.

Optionally, the bitstream that includes the picture data and that is obtained by the decoder device includes a sequence parameter set (Sequence Parameter Set, SPS), a picture parameter set (Picture Parameter Set, PPS), a slice header (slice header) or a slice segment header (slice segment header), and a CTU bitstream. The CTU bitstream carries the picture data.

S601. The decoder device decodes the bitstream obtained by the decoder device, to obtain node split mode information of a first-level coding tree.

A root node of the first-level coding tree corresponds to one CTU, and a leaf node of the first-level coding tree is defined by using the root node of the first-level coding tree and a node split mode corresponding to the node split mode information of the first-level coding tree. The node split mode corresponding to the first-level coding tree includes quadtree split.

After obtaining the bitstream, the decoder device parses the CTU bitstream in the bitstream to obtain the node split information (including the split mode) of the first-level coding tree.

Optionally, a method for parsing the CTU bitstream by the decoder device to obtain the node split information of the first-level coding tree may be: The decoder device parses the CTU bitstream by using the CTU as a root node of the first-level coding tree, to obtain a first identifier (for example, SplitFlag) that is included in a syntactic element in the CTU bitstream and that is used to indicate how to split the CTU into at least one CU, that is, the first identifier represents the node split mode information of the first-level coding tree. In an example, if a numeric value of specific SplitFlag is 0, it indicates that a node corresponding to the specific SplitFlag is a leaf node of the first-level coding tree. If a numeric value of SplitFlag is 1, SplitFlag of four child nodes of a node corresponding to the specific SplitFlag are further obtained until information about all leaf nodes of the first-level coding tree is determined.

It should be noted that, if a width of a picture region corresponding to a node is equal to a first threshold (for example, the first threshold is 8 or 16), the node is a leaf node of the first-level coding tree, and a numeric value of SplitFlag corresponding to the node is 0.

Optionally, the method for parsing the CTU bitstream by the decoder device to obtain the node split information of the first-level coding tree may also be: The decoder device parses the CTU bitstream by using the CTU as a root node of the first-level coding tree, to obtain a second identifier (for example, NSFlag) that is included in a syntax element in the CTU bitstream and that is used to indicate whether to split a node of the first-level coding tree. If a numeric value of the second identifier is a first value (for example, 1), it indicates that the node corresponding to the second identifier is a leaf node of the first-level coding tree and is also a leaf node of the second-level coding tree; or if a numeric value of the second identifier is a second value (for example, 0), a third identifier (for example, QTSplitFlag) included in a syntax element is obtained. If a numeric value of the third identifier is a third value (for example, 0), it indicates that a node corresponding to the third identifier is a leaf node of the first-level coding tree but is not a leaf node of the second-level coding tree; or if a numeric value of the third identifier is a fourth value (for example, 1), second identifiers of four child nodes of a node corresponding to the third identifier are further obtained until information about all leaf nodes of the first-level coding tree is determined.

It should be noted that, if a width of a picture region corresponding to a node is equal to the first threshold (for example, the first threshold is 8 or 16), the node is a leaf node of the first-level coding tree, and a numeric value of a third identifier corresponding to the node is a third value. In addition, if a width or a height of a picture region corresponding to a node is greater than a second threshold, and a value of the second identifier corresponding to the node is a second value, a numeric value of the third identifier is the third value; or if a split mode corresponding to a node is QT splitting, a numeric value of the second identifier corresponding to the node is a second value and a numeric value of the third identifier corresponding to the node is a third value.

In an example, a syntax table of the first-level coding tree in this embodiment of this application is shown in Table 1. In Table 1, coding_quadtree( ) is a syntax structure of the first-level coding tree, and describes information about a node of the first-level coding tree.

In Table 1, coding_quadtree(xCtb, yCtb, CtbLog2SizeY, 0) is parsed by using the CTU as a root node, where CtbLog2SizeY is a logarithm of a side length of the CTU with 2 as a base (herein a picture region corresponding to the CTU is square), and xCtb and yCtb respectively represent a horizontal coordinate offset and a vertical coordinate offset of an upper left corner of the picture region corresponding to the CTU, relative to an upper left corner of a picture region corresponding to a node; x0 and y0 respectively represent a horizontal coordinate offset and a vertical coordinate offset of the upper left corner of the picture region corresponding to the node, relative to the upper left corner of the picture region corresponding to the CTU; log 2CbSize represents a logarithm of a side length of the picture region corresponding to the node with 2 as a base (because the picture region corresponding to the CTU is square and the first-level coding tree uses only quadtree split, and picture regions corresponding to all nodes of the first-level coding tree are also square and have equal widths and heights, only the side length needs to be defined, and there is no need to distinguish between the width and the height); cqtDepth represents a depth of the node in the first-level coding tree; condition condA represents a condition under which a node split information syntax element split_cu_flag of the first-level coding tree needs to be parsed out from the bitstream. For example, condA is "A picture region corresponding to a node is in the picture region corresponding to the CTU, and the side length of the picture region corresponding to the node is greater than a threshold". If split_cu_flag is 0, it indicates that the node is not split based on a quadtree and is a leaf node of the first-level coding tree. In this case, the leaf node is parsed based on a syntax structure coding_second_tree( ) of the second-level coding tree; or if split_cu_flag is 1, it indicates that the node is split based on a quadtree. In this case, the node is split into four child nodes, a side length and coordinates of a picture region corresponding to each child node, and a depth of each child node in the first-level coding tree are determined, and the child nodes are parsed sequentially based on coding_quadtree( ). "X>>Y" indicates moving X rightward by Y bits. "X<<Y" indicates moving X leftward by Y bits. ae(v) indicates parsing a syntactic element based on CABAC.

TABLE 1

| | Descriptor |
|---|---|
| coding_quadtree(x0, y0, log2CbSize, cqtDepth) { | |
|   if( condA ) | |
|     split_cu_flag[x0 ][y0 ] | ae(v) |
|     if( split_cu_flag[x0 ][y0 ] ) } | |
|       x1 = x0 + ( 1 << ( log2CbSize - 1) ) | |
|       y1 = y0 + ( 1 << ( log2CbSize - 1) ) | |
|         coding_quadtree(x0, y0, log2CbSize1, cqtDepth +1) | |
|     if( x1 <pic_width_in_luma_samples ) | |
|       coding_quadtree(x1, y0, log2CbSize1, cqtDepth +1) | |
|     if( y1 <pic_height_in_luma_samples ) | |
|       coding_quadtree(x0, y1, log2CbSize1, cqtDepth +1) | |
|     if(x1<pic_width_in_luma_sample&&y1<pic_height_in_luma_samples) | |
|       coding_quadtree(x1, y1, log2CbSize1, cqtDepth +1) | |
| } else | |
|   coding_second_tree(x0, y0, log2CbSize, log2CbSize, | |
|   0, cqtDepth) | |
| } | |

S602. The decoder device parses the bitstream obtained by the decoder device, to obtain node split mode information of a second-level coding tree.

The node split mode information of the second-level coding tree indicates a split mode corresponding to a first node of the second-level coding tree, the split mode corresponding to the first node is one mode in a candidate-split-mode set corresponding to the first node, the candidate-split-mode set corresponding to the first node is determined according to a first preset split condition, the first preset split condition is used to indicate whether to restrict that the first node is split in a target split mode, and the target split mode includes at least one of horizontal binary split, horizontal ternary split, vertical binary split, and vertical ternary split.

A root node of the second-level coding tree is a leaf node of the first-level coding tree. A node split mode corresponding to the second-level coding tree is different from the node split mode corresponding to the first-level coding tree. In this embodiment, the node split mode corresponding to the second-level coding tree includes binary tree split and ternary tree split, and the binary tree split includes the horizontal binary split and the vertical binary split, and the ternary tree split includes the horizontal ternary split and the vertical ternary split.

After obtaining the node split mode information of the first-level coding tree, the decoder device uses the leaf node of the first-level coding tree that is defined by the root node of the first-level coding tree and the node split mode corresponding to the node split mode information of the first-level coding tree, as a root node of the second-level coding tree; and parses the CTU bitstream to obtain the node split mode information of the second-level coding tree.

Optionally, a method for parsing the CTU bitstream by the decoder device to obtain the node split mode information of the second-level coding tree may be: The decoder device parses the CTU bitstream to obtain a fourth identifier (for example, STSplitMode) used to indicate how to split a node of the second-level coding tree, that is, the fourth identifier indicates the node split mode information of the second-level coding tree.

If a fourth identifier indicates no further splitting (for example, STSplitMode is equal to 0), it indicates that a node corresponding to the fourth identifier is a leaf node of the second-level coding tree.

If a fourth identifier indicates further splitting (for example, STSplitMode is equal to 1, 2, 3, or 4), it indicates that a node corresponding to the fourth identifier includes two or three child nodes, and the decoder device further obtains a fourth identifier of a child node of the node corresponding to the fourth identifier, until information about all leaf nodes of the second-level coding tree is determined. For example, if STSplitMode is equal to 1, it indicates that a split mode that corresponds to the node corresponding to the fourth identifier is the horizontal binary split; if STSplitMode is equal to 2, it indicates that a split mode that corresponds to the node corresponding to the fourth identifier is the vertical binary split; if STSplitMode is equal to 3, it indicates that a split mode that corresponds to the node corresponding to the fourth identifier is the horizontal ternary split; or if STSplitMode is equal to 4, it indicates that a split mode that corresponds to the node corresponding to the fourth identifier is the vertical ternary split.

Optionally, the method for parsing the CTU bitstream by the decoder device to obtain the node split mode information of the second-level coding tree may also be: For the first node of the second-level coding tree, the decoder device first parses the bitstream, then determines, according to the first preset split condition, the candidate-split-mode set corresponding to the first node, and then parses the bitstream based on the candidate-split-mode set corresponding to the first node, to determine split mode information corresponding to the first node.

Herein, the first preset split condition includes at least one of the following preset split sub-conditions: a first preset split sub-condition, a second preset split sub-condition, a third preset split sub-condition, a fourth preset split sub-condition, a fifth preset split sub-condition, a sixth preset split sub-condition, a seventh preset split sub-condition, an eighth preset split sub-condition, and a ninth preset split sub-condition.

The first preset split sub-condition is: If a width-to-height ratio of a picture region corresponding to the first node is greater than or equal to a first preset threshold (such as 8 or 4), the candidate-split-mode set corresponding to the first node does not include the horizontal binary split or the horizontal ternary split. The width-to-height ratio of the picture region corresponding to the first node is a ratio of a width of the picture region corresponding to the first node to a height of the picture region corresponding to the first node.

The second preset split sub-condition is: If a height-to-width ratio of the picture region corresponding to the first node is greater than or equal to a second preset threshold (such as 8 or 4), the candidate-split-mode set corresponding to the first node does not include the vertical binary split or the vertical ternary split. The height-to-width ratio of the picture region corresponding to the first node is a ratio of the height of the picture region corresponding to the first node to the width of the picture region corresponding to the first node.

The third preset split sub-condition is: If a ratio of an area of the picture region corresponding to the first node to an area of a picture region corresponding to the leaf node of the first-level coding tree to which the first node belongs is less than or equal to a third preset threshold (such as 16 or 8), the candidate-split-mode set corresponding to the first node does not include the horizontal binary split, the horizontal ternary split, the vertical binary split, or the vertical ternary split.

The fourth preset split sub-condition is: If the split mode corresponding to the first node includes a first split mode, and decoding of a first child node of the first node is later than that of a second child node of the first node, and a split mode corresponding to the second child node is the first split mode, a candidate-split-mode set corresponding to the first child node does not include the first split mode. The first split mode is the horizontal binary split or the vertical binary split.

For example, if the split modes corresponding to the first node and the second child node are both the horizontal ternary split, the candidate-split-mode set corresponding to the first child node does not include the horizontal ternary split, that is, splitting the first child node in the horizontal ternary split mode is not allowed.

The fifth preset split sub-condition is: If the split mode corresponding to the first node includes a second split mode, and an area of a picture region corresponding to the first child node of the first node is the smallest among areas of picture regions corresponding to three child nodes of the first node, the candidate-split-mode set corresponding to the first child node does not include the second split mode. The second split mode is the horizontal ternary split or the vertical ternary split.

For example, if the split mode corresponding to the first node is the horizontal ternary split, the candidate-split-mode set corresponding to the first child node does not include the horizontal ternary split, that is, splitting the first child node in the horizontal ternary split mode is not allowed.

The sixth preset split sub-condition is: If the split mode corresponding to the first node includes the second split mode, and the area of the picture region corresponding to the first child node of the first node is the largest among the areas of the picture regions corresponding to the three child nodes of the first node, the candidate-split-mode set corresponding to the first child node does not include the second split mode.

The seventh preset split sub-condition is: If a ratio of the width of the picture region corresponding to the first node to a preset side length of a minimum CU is less than or equal to a third preset threshold, the candidate-split-mode set corresponding to the first node does not include the vertical ternary split; or if a ratio of the height of the picture region corresponding to the first node to the preset side length of the minimum CU is less than or equal to the third preset threshold, the candidate-split-mode set corresponding to the first node does not include the horizontal ternary split.

The eighth preset split sub-condition is: If the area of the picture region corresponding to the first node is less than or equal to a fourth preset threshold, the candidate-split-mode set corresponding to the first node does not include the horizontal binary split, the horizontal ternary split, the vertical binary split, or the vertical ternary split.

The ninth preset split sub-condition is: If the split mode corresponding to the first node is the second split mode, and the area of the picture region corresponding to the first child node of the first node is the largest among the areas of the picture regions corresponding to the three child nodes of the first node, the candidate-split-mode set corresponding to the first child node does not include the first split mode. A split direction of the first split mode is the same as that of the second split mode.

For example, if the split mode corresponding to the first node is the horizontal ternary split, and the area of the picture region corresponding to the first child node of the first node is the largest among the areas of the picture regions corresponding to the three child nodes of the first node, the candidate-split-mode set corresponding to the first child node does not include the horizontal binary split, that is, splitting the first child node in the horizontal binary split mode is not allowed.

For example, the first preset split condition in this embodiment of this application may include the third preset split sub-condition; may include the fourth preset split sub-condition, or may include the fifth preset split sub-condition; may include the first preset split sub-condition and the second preset split sub-condition; may include the first preset split sub-condition, the second preset split sub-condition, the fourth preset split sub-condition, the sixth preset split sub-condition, and the seventh preset split sub-condition; may include the first preset split sub-condition, the second preset split sub-condition, the third preset split sub-condition, and the seventh preset split sub-condition; may include the first preset split sub-condition, the second preset split sub-condition, the third preset split sub-condition, the fifth preset split sub-condition, and the seventh preset split sub-condition; may include the fifth preset split sub-condition and the seventh preset split sub-condition; may include the third preset split sub-condition, the fourth preset split sub-condition, and the seventh preset split sub-condition; or may include the first preset split sub-condition, the second preset split sub-condition, the fourth preset split sub-condition, and the fifth preset split sub-condition.

Certainly, the first preset split condition in this embodiment of this application may alternatively be another combination of the foregoing preset split sub-conditions. Details are not described herein again.

Optionally, the decoder device may obtain the first preset threshold, the second preset threshold, the third preset threshold, the fourth preset threshold, and the preset side length of the minimum CU from the SPS, the PPS, or the slice header in the bitstream including the picture data. Certainly, the first preset threshold, the second preset threshold, the third preset threshold, the fourth preset threshold, and the preset side length of the minimum CU may alternatively be preset by a picture processing system.

In addition, in addition to the first preset split sub-condition to the ninth preset split sub-condition, the first preset split condition in this embodiment of this application may also include another condition. This is not specifically limited in this embodiment of this application.

For example, the first preset split condition further includes any one of the following conditions:

A. If a depth of the first node in the second-level coding tree is equal to a preset maximum depth in the second-level coding tree (for example, the preset maximum depth in the second-level coding tree is 3, 4, or 2), the candidate-split-mode set corresponding to the first node includes no further splitting.

The encoder device may obtain the preset maximum second-level coding tree level from the SPS, the PPS, or the slice header in the bitstream including the picture data.

B. If the width of the picture region corresponding to the first node is equal to a width of the preset minimum CU, the candidate-split-mode set corresponding to the first node does not include the horizontal binary split.

C. If the width or the height of the picture region corresponding to the first node is greater than a fifth preset threshold (for example, 64 or 128), the candidate-split-mode set corresponding to the first node includes no further splitting.

D. If a ratio of the width of the picture region corresponding to the first node to the preset side length of the minimum CU is less than a sixth preset threshold, the candidate-split-mode set corresponding to the first node does not include the vertical ternary split; or if a ratio of the height of the picture region corresponding to the first node to the preset side length of the minimum CU is less than a seventh preset threshold, the candidate-split-mode set corresponding to the first node does not include the horizontal ternary split.

It can be known from the foregoing descriptions that, the fourth identifier in this embodiment of this application is used to indicate how to split a node of the second-level coding tree. Optionally, the fourth identifier may include first information used to indicate whether to further split the node, second information used to indicate a direction in which the node is split, and third information used to indicate a mode in which the node is split.

For example, the first information is represented by STSplitFlag. If a numeric value of STSplitFlag is equal to 0, it indicates that a node corresponding to STSplitFlag is no longer split; or if a numeric value of STSplitFlag is equal to 1, it indicates that a node corresponding to STSplitFlag is further split. The second information is represented by STSplitDir. If a numeric value of STSplitDir is equal to 0, it indicates that a node corresponding to STSplitDir is split in a horizontal direction; or if a numeric value of STSplitDir is equal to 1, it indicates that a node corresponding to STSplitDir is split in a vertical direction. The third information is represented by STSplitType. If a numeric value of STSplitType is equal to 0, it indicates that a split mode that corresponds to a node corresponding to STSplitType is binary tree split. If a numeric value of STSplitDir is equal to 1, it indicates that a split mode that corresponds to the node corresponding to STSplitType is ternary tree split.

Optionally, the fourth identifier in this embodiment of this application may alternatively include: a binary tree split identifier used to indicate whether to split a node corresponding to the fourth identifier in a binary tree split mode; a ternary tree split identifier used to indicate whether to split, in a ternary tree split mode, a node corresponding to the fourth identifier; and second information (the splitting direction identifier is the same as the splitting direction identifier in the foregoing example).

For example, the binary tree split identifier is represented by BTFlag. If a numeric value of BTFlag is equal to 0, it indicates that a split mode that corresponds to the node corresponding to the fourth identifier is not BT splitting; or if a numeric value of BTFlag is equal to 1, it indicates that a split mode that corresponds to the node corresponding to the fourth identifier is BT splitting. The ternary tree split identifier is TTFlag. If a numeric value of TTFlag is equal to 0, it indicates that a split mode that corresponds to the node corresponding to the fourth identifier is not TT splitting; or if a numeric value of TTFlag is equal to 1, it indicates that a split mode that corresponds to the node corresponding to the fourth identifier is TT splitting.

Certainly, the fourth identifier in this embodiment of this application may alternatively include any combination of the first information, the second information, and the third information. This is not specifically limited in this embodiment of this application.

It is easily understood that, if the split mode corresponding to the second-level coding tree further includes a split mode other than the binary tree split and the ternary tree split, the fourth identifier may include more information.

The fourth identifier may include the first information, the second information, and the third information. Therefore, after determining the candidate-split-mode set corresponding to the first node, the decoder device determines the first information, the second information, and the third information based on the candidate-split-mode set corresponding to the first node. In this case, the split mode information corresponding to the first node may be determined.

Specifically, the decoder device first determines the candidate-split-mode set of the first node according to the first preset split condition. Then, the decoder device determines, based on the candidate-split-mode set of the first node, whether the first information, the second information, and the third information can be parsed out from the bitstream. If any one of the first information, the second information, and the third information cannot be parsed out from the bitstream, therefore, a numeric value of the information is a system default value.

For example, the first information is represented by STSplitFlag, the second information is represented by STSplitDir, and the third information is represented by STSplitType. If the candidate-split-mode set corresponding to the first node does not include the horizontal binary split, the horizontal ternary split, the vertical binary split, or the vertical ternary split, the split mode corresponding to the first node is no further splitting, that is, none of STSplitFlag, STSplitDir, and STSplitType needs to be parsed out from the bitstream, numeric values of STSplitFlag, STSplitDir, and STSplitType are all 0. If the candidate-split-mode set corresponding to the first node includes at least one of the horizontal binary split, the horizontal ternary split, the vertical binary split, and the vertical ternary split, the decoder device first parses out STSplitFlag from the bitstream. If a numeric value of STSplitFlag is 0, numeric values of STSplitDir and STSplitType are 0 by default; or if a numeric value of STSplitFlag is 1, STSplitDir (the parsing mode of STSplitDir is related to the candidate-split-mode set corresponding to the first node) is further parsed, and STSplitType (the parsing mode of STSplitType is related to the candidate-split-mode set corresponding to the first node) is parsed out based on the numeric value of STSplitDir. If the candidate-split-mode set corresponding to the first node includes the horizontal binary split, the horizontal ternary split, the vertical binary split, and the vertical ternary split, the decoder device parses out STSplitDir and STSplitType from the bitstream sequentially; or if the candidate-split-mode set corresponding to the first node includes one to three split modes, at least one of STSplitDir and STSplitType may be directly obtained instead of being parsed out from the bitstream.

In an example, Table 2 shows all possible cases of the candidate-split-mode set corresponding to the first node in this embodiment, and shows a method parsing for the first information, the second information, and the third information that correspond to each case. In Table 2, if a numeric value of the vertical binary split (Vertical Binary Tree, VBT) is 0, it indicates that the candidate-split-mode set corresponding to the first node does not include the vertical binary split; if a numeric value of VBT is 1, it indicates that the candidate-split-mode set corresponding to the first node includes the vertical binary split; if a numeric value of the horizontal binary split (Horizontal Binary Tree, HBT) is 0, it indicates that the candidate-split-mode set corresponding to the first node does not include the horizontal binary split; if a numeric value of the HBT is 1, it indicates that the candidate-split-mode set corresponding to the first node includes the horizontal binary split; if a numeric value of the vertical ternary split (Vertical Ternary Tree, VTT) is 0, it indicates that the candidate-split-mode set corresponding to the first node does not include the vertical ternary split; if a value of VTT is 1, it indicates that the candidate-split-mode set corresponding to the first node includes the vertical ternary split; if a numeric value of the horizontal ternary split (Horizontal ternary Tree, HTT) is 0, it indicates that the candidate-split-mode set corresponding to the first node does not include the horizontal ternary split; or if a numeric value of the HTT is 1, it indicates that the candidate-split-mode set corresponding to the first node includes the horizontal ternary split. a, b, and c respectively indicate that STSplitFlag, STSplitDir, and STSplitType are parsed out from the bitstream; and NA(x) indicates setting a corresponding bit to a default value x. When it is learned through parsing that STSplitFlag 0, numeric values of STSplitDir and STSplitType are 0 by default. When it is learned through parsing that STSplitFlag is 1, STSplitDir is first parsed, and then STSplitType is parsed out based on a numeric value of STSplitDir. A symbol ! is a logical NOT operation, an expression "exp?m:n" indicates that, if exp is true, m is used; otherwise, n is used. For example, STSplitDir?c:NA(1) indicates that, if a numeric value of STSplitDir is not 0 (that is, the numeric value of STSplitDir is equal to 1. This is because the numeric value of STSplitDir in this embodiment is 0 or 1), STSplitType is obtained from the bitstream; otherwise, the numeric value of STSplitType is 1 by default. For another example, !STSplitDir? NA(0):NA(1) indicates that, if a numeric value of STSplitDir is equal to 0, a numeric value of STSplitType is 0 by default; otherwise, a numeric value of STSplitType is 1 by default.

With reference to Table 2, it can be learned that the decoder device may determine STSplitFlag, STSplitDir, and STSplitType based on the candidate-split-mode set corresponding to the first node.

In an example, for a candidate-split-mode set 15 in Table 2, if the candidate-split-mode set corresponding to the first node does not include the vertical binary split, the horizontal binary split, the horizontal ternary split, or the vertical ternary split, numeric values of STSplitFlag, STSplitDir, and STSplitType are all 0 by default.

In another example, for a candidate-split-mode set 12 in Table 2, if the candidate-split-mode set corresponding to the first node does not include the horizontal binary split, the horizontal ternary split, or the vertical ternary split, the decoder device first parses out STSplitFlag from the bitstream; if a numeric value of STSplitFlag is 0, numeric values of STSplitDir and STSplitType are both 0 by default; or if a numeric value of STSplitFlag is 1, a numeric value of STSplitDir is 1 by default, and a numeric value of STSplitType is 0 by default.

In another example, for a candidate-split-mode set 6 in Table 2, if the candidate-split-mode set corresponding to the first node does not include the horizontal ternary split or the vertical ternary split, the decoder device first parses out STSplitFlag from the bitstream; if a numeric value of STSplitFlag is 0, numeric values of STSplitDir and STSplitType are both 0 by default; if a numeric value of STSplitFlag is 1, the decoder device parses out STSplitDir from the bitstream, and sets a numeric value of STSplitType to 0 by default.

TABLE 2

| Candidate-split-mode set | Split mode | | | | Parsing mode | | |
|---|---|---|---|---|---|---|---|
| | HBT | VBT | HTT | VTT | STSplitFlag | STSplitDir (STSplitFlag == 1) | STSplitType (STSplitFlag == 1) |
| 1 | 1 | 1 | 1 | 1 | a | b | c |
| 2 | 0 | 1 | 1 | 1 | a | b | STSplitDir? c: NA(1) |
| 3 | 1 | 0 | 1 | 1 | a | b | !STSplitDir? c: NA(1) |
| 4 | 1 | 1 | 0 | 1 | a | b | STSplitDir? c: NA(0) |
| 5 | 1 | 1 | 1 | 0 | a | b | !STSplitDir? c: NA(0) |
| 6 | 1 | 1 | 0 | 0 | a | b | NA(0) |
| 7 | 1 | 0 | 1 | 0 | a | NA(0) | c |
| 8 | 0 | 1 | 0 | 1 | a | NA(1) | c |
| 9 | 1 | 0 | 0 | 1 | a | b | !STSplitDir? NA(0) :NA(1) |
| 10 | 0 | 1 | 1 | 0 | a | b | STSplitDir? NA(0) : NA(1) |
| 11 | 1 | 0 | 0 | 0 | a | NA(0) | NA(0) |
| 12 | 0 | 1 | 0 | 0 | a | NA(1) | NA(0) |
| 13 | 0 | 0 | 1 | 0 | a | NA(0) | NA(1) |
| 14 | 0 | 0 | 0 | 1 | a | NA(1) | NA(1) |
| 15 | 0 | 0 | 0 | 0 | NA(0) | NA(0) | NA(0) |

In another example, for the candidate-split-mode set 5 in Table 2, the first corresponding candidate-split-mode set corresponding to the first node does not include vertical ternary split, and the decoder device first parses out STSplitFlag from the bitstream. If a numeric value of STSplitFlag is 0, numeric values of STSplitDir and STSplitType are both 0 by default; or if a numeric value of STSplitFlag is 1, the decoder device parses out STSplitDir from the bitstream. If a numeric value of STSplitDir is 1, a numeric value of STSplitType is 0 by default; or if a numeric value of STSplitDir is 0, the decoder device parses out STSplitType from the bitstream.

After determining the numeric values of STSplitFlag, STSplitDir, and STSplitType, the decoder device may determine the fourth identifier STSplitMode based on the three numeric values, that is, determine the split mode information of the first node of the second-level coding tree.

For example, the decoder device determines a numeric value of STSplitMode based on the numeric values of STSplitFlag, STSplitDir, and STSplitType in a mapping mode shown in Table 3.

TABLE 3

| STSplitMode | STSplitFlag | STSplitDir | STSplitType |
|---|---|---|---|
| 0 | 0 | 0 | 0 |
| 1 | 1 | 0 | 0 |
| 2 | 1 | 1 | 0 |
| 3 | 1 | 0 | 1 |
| 4 | 1 | 1 | 1 |

In an example, with reference to the foregoing example, if numeric values of STSplitFlag, STSplitDir, and STSplitType that corresponds to the first node are respectively 1, 1, and 0, a value of STSplitMode is 2, that is, the split mode corresponding to the first node is the vertical binary split.

Optionally, the candidate-split-mode set may alternatively include only the horizontal ternary split and the vertical ternary split, and does not include the horizontal binary split or the vertical binary split. In this case, the decoder device first parses out STSplitFlag from the bitstream. If a numeric value of STSplitFlag is 0, numeric values of STSplitDir and STSplitType are both 0 by default; or if a numeric value of STSplitFlag is 1, the decoder device parses out STSplitDir from the bitstream, and a numeric value of STSplitType is 1 by default.

It is easily understood that, if the split mode of the second-level coding tree further includes a split mode other than the horizontal binary split, the vertical binary split, the horizontal ternary split, and the vertical ternary split, the information parsing method shown in Table 2 needs to be extended. This is not specifically limited in this embodiment of this application.

It can be seen from Table 2 that, modes for parsing out the first information, the second information, and the third information that correspond to several candidate-split-mode sets in the 15 candidate-split-mode sets are the same or similar. Therefore, the several candidate-split-mode sets may be further combined into one category, and one parsing method is used for each category. In this case, a method for parsing out the first information, the second information, and the third information is equivalent to the parsing method for determining the first information, the second information, and the third information according to Table 2, but there are fewer determining branches.

For example, the decoder device may determine the first information STSplitFlag in a parsing mode shown in Table 4, determine the second information STSplitDir in a parsing mode shown in Table 5, and determine the third information STSplitType in a parsing mode shown in Table 6. && is a logic AND operation, || is a logic OR operation, and ! is a logic NOT operation. Similar to Table 2, a, b, and c respectively indicate that corresponding information needs to be parsed out from the bitstream, and NA(x) indicates that a value of corresponding information is set to x.

TABLE 4

| | NumType > 0 | NumType == 0 |
|---|---|---|
| STSplitFlag | a | NA(0) |

As shown in Table 4, when a quantity (namely, a first numeric value represented by NumType) of split modes included in the candidate-split-mode set is greater than 0, the decoder device parses out STSplitFlag from the bitstream; or when a numeric value of NumType is equal to 0, a numeric value of STSplitFlag is 0 by default. When determining that the numeric value of STSplitFlag is 1, the decoder device continues to parse STSplitDir and STSplitType; otherwise, numeric values of STSplitDir and STSplitType are both 0 by default.

With reference to Table 2, it can be seen that, in the candidate-split-mode sets 1 to 14 in Table 2, each candidate-split-mode set includes a plurality of split modes, and the STSplitFlag corresponding to each candidate-split-mode set needs to be parsed out from the bitstream. This corresponds to the case shown in Table 4. In addition, the candidate-split-mode set 15 in Table 2 does not include a split mode, that is, a quantity of split modes included in the candidate-split-mode set 15 is 0. A numeric value of STSplitFlag corresponding to the candidate-split-mode set 15 is NA(0) by default, and this corresponds to Table 4.

TABLE 5

| | NumType == 2 | | | | |
|---|---|---|---|---|---|
| | NumType >=3 | (HBT && VBT) \|\| (HBT && VTT) \|\| (VBT && HTT) | (HBT && HTT) \|\| (VBT && VTT) | NumType == 1 | NumType == 0 |
| STSplitDir | b | b | NA (!HBT) | NA (VBT \|\| VTT) | NA(0) |

(VBT && VTT) is met, a numeric value of STSplitDir is set to !HBT (that is, when HBT is 0, STSplitDir is 1; or when HBT is 1, STSplitDir is 0).

With reference to Table 2, it can be learned that, in the candidate-split-mode sets 1 to 5 in Table 2, a quantity of split modes included in each candidate-split-mode set is greater than or equal to 3, and STSplitDir corresponding to each of the candidate-split-mode sets 1 to 5 needs to be parsed out from the bitstream. This corresponds to the case shown in Table 5. In the candidate-split-mode sets 6 to 10 in Table 2, a quantity of split modes included in each candidate-split-mode set is equal to 2, and under different conditions, there are different modes for parsing out STSplitDir corresponding to all of the candidate-split-mode sets 6 to 10, and this corresponds to the case shown in Table 5. In the candidate-split-mode sets 11 to 14 in Table 2, a quantity of split modes included in each candidate-split-mode set is equal to 1, and a numeric value of STSplitDir corresponding to each of the candidate-split-mode sets 11 to 14 is a default value NA(VBT||VTT), and this corresponds to the case shown in Table 5. A quantity of split modes included in the candidate-split-mode set 15 in Table 2 is equal to 0, and STSplitDir corresponding to the candidate-split-mode set 15 is a default value NA(0), and this corresponds to the case shown in Table 5.

TABLE 6

| | | | NumType == 3 | | | |
|---|---|---|---|---|---|---|
| | NumType == 4 | NumType == 0 | (!HBT \|\| !HTT) && STSplitDir | (!VBT \|\| !VTT)&& !STSplitDir | (!HBT \|\| !HTT) && !STSplitDir | (!VBT \|\| !VTT)&& STSplitDir |
| STSplitType | c | NA(0) | c | c | NA(!HBT) | NA(!VBT) |
| | | NumType == 1 | NumType == 2 (!HTT && !VTT) | (HBT && HTT) \|\| (VBT && VTT) | (HBT && VTT) | (VBT && HTT) |
| STSplitType | NA(HBT \|\| VBT) | NA(0) | c | NA(STSplitDir) | NA(!STSplitDir) |

As shown in Table 5, when a numeric value of NumType is greater than or equal to 3, a numeric value of NumType is equal to 2, a numeric value of NumType is equal to 1, and a numeric value of NumType is equal to 0, the decoder device determines STSplitDir in different modes. In addition, when the numeric value of NumType is equal to 2, the decoder device further needs to determine, depending on different conditions, a specific mode for determining STSplitDir.

For example, when the numeric value of NumType is greater than or equal to 3, the decoder device parses the bitstream to obtain STSplitDir. When the numeric value of NumType is equal to 2 and a condition (HBT && HTT)||

As shown in Table 6, when a numeric value of NumType is equal to 4, a numeric value of NumType is equal to 3, a numeric value of NumType is equal to 2, a numeric value of NumType is equal to 1, and a numeric value of NumType is equal to 0, the decoder device determines STSplitType in different modes. In addition, when the numeric value of NumType is equal to 2 and the numeric value of NumType is equal to 3, the decoder device further needs to determine, depending on different conditions, a specific mode for determining STSplitType. Similar to Table 4 and Table 5, Table 6 also corresponds to Table 2.

The method for determining STSplitType by the decoder device according to Table 6 is similar to the method for determining STSplitDir by the decoder device according to Table 5, and details are not described herein again.

It should be noted that, if the split information of the first-level coding tree is represented by NSFlag and QTSplitFlag, when a numeric value of NSFlag of a node is the first value, the node is a leaf node of the second-level coding tree, and a numeric value of STSplitFlag is 0 by default; or when a numeric value of NSFlag of a node is the second value and a numeric value of QTSplitFlag is the second value, the node is not a leaf node of the second-level coding tree, and a numeric value of STSplitFlag is 1 by default.

Optionally, in this embodiment of this application, after performing S601, the decoder device performs S602; or in a process of performing S601, after obtaining information about a leaf node of the first-level coding tree, may immediately perform S602 based on the leaf node of the first-level coding tree, until a last leaf node of the first-level coding tree is obtained.

S603. If the node split mode information of the second-level coding tree indicates that the split mode corresponding to the first node of the second-level coding tree is no further splitting, the decoder device parses the bitstream to obtain encoding information of the first node.

In this embodiment of this application, if the node split mode information of the second-level coding tree indicates that the split mode corresponding to the first node of the second-level coding tree is no further splitting, it indicates that the first node is a leaf node of the second-level coding tree.

It can be known from the foregoing descriptions that a node that is no longer split corresponds to one CU. Correspondingly, the first node corresponds to one CU.

Specifically, the decoder device parses a syntax structure of a coding unit in the bitstream (for example, a syntax structure coding_unit( ) in H.265. For explanations about the syntax structure coding_unit( ), refer to the following descriptions) to obtain encoding information of each CU. The encoding information of each CU includes information such as a prediction mode and a transform coefficient of the CU. Herein, that the decoder device obtains the encoding information of each CU means that the decoder device obtains encoding information of each leaf node of the second-level coding tree.

Optionally, in this embodiment of this application, in a process of performing S602, after obtaining information about a leaf node of the second-level coding tree, the decoder device may parse the bitstream to obtain encoding information of the leaf node; and after obtaining the encoding information of the leaf node, continue to obtain a leaf node of a next second-level coding tree and encoding information of the leaf node of the next second-level coding tree, and so on, until a leaf node of a last second-level coding tree is obtained.

In an example, a syntax table of the second-level coding tree in this embodiment of this application is shown in Table 7. coding_second_tree( ) is a syntax structure of the second-level coding tree, and describes information about a node of the second-level coding tree.

In Table 7, log 2CuWidth and log 2CuHeight respectively represent a logarithmic value of a picture region corresponding to a node with a base of 2 and a logarithmic value of the height of the picture region corresponding to the node with a base of 2, stDepth represents a depth of a leaf node of the second-level coding tree, and the condition condB represents a condition under which a syntactic element STSplitMode of the node split information of the second-level coding tree needs to be parsed out from the bitstream. For example, the condition condB is "a depth stDepth of a node in the second-level coding tree is less than a preset maximum depth maxSTDepth in the second-level coding tree, both a width and a height of a picture region corresponding to the node are less than a threshold maxSTSize, and the width or the height of the picture region corresponding to the node is greater than a threshold minSTSize". maxSTDepth is an integer (such as 2, 3, or 4) greater than 0, and may be preset or parsed out from the SPS; minSTSize is an integer (such as 4 or 8) greater than 0, and may be preset or parsed out from the SPS; maxSTSize is an integer (such as 64 or 128) greater than minSTSize, and may be preset or parsed out from the SPS.

A value range of STSplitMode is 0, 1, 2, 3, and 4. When a numeric value of STSplitMode is 0, a node is a leaf node of the second-level coding tree, and the node corresponds to one CU. In this case, information about a coding unit is parsed out based on a CU syntax structure coding_unit( ). A mode of organizing a syntax element of the information about the coding unit is not limited in this embodiment of this application. When a numeric value of STSplitMode ranges from 1 to 4, a node is split into two or three child nodes separately through the horizontal binary split, vertical binary split, horizontal ternary split, and vertical ternary split, and for each child node, the width, height, and coordinates of a picture region corresponding to the child node, and a depth in the second-level coding tree are determined, and the child nodes are sequentially parsed based on coding_second_tree( ).

Optionally, in this embodiment of this application, STSplitFlag, STSplitDir, and STSplitType may be encoded in a bypass (by-pass) manner, or may be encoded by using one probability model, or a probability model may be adaptively selected based on a context.

For example, a method for selecting a context model of STSplitFlag is: A size S1 of a CU corresponding to a left side of a picture region corresponding to a node, a size S2 of a CU corresponding to an upper side of the picture region corresponding to the node, and a size S3 of the picture region corresponding to the node are obtained. If both S1 and S2 are less than S3, a context model numbered 2 is selected; or if only one of S1 and S2 is less than S3, a context model numbered 1 is selected; otherwise (none of S1 and S2 is less than S3), a context model numbered 0 is selected. The left side of the picture region corresponding to the node is, for example, (x0−1, y0), and the upper side of the picture region corresponding to the node is, for example, (x0, y0−1).

A method for selecting a context model of STSplitDir is: If a width of the picture region corresponding to the node is twice greater than the height, a model numbered 0 is used; if a width of the picture region corresponding to the node is equal to twice of the height, a model numbered 1 is used; if a width of the picture region corresponding to the node is equal to the height, a model numbered 2 is used; if a width of the picture region corresponding to the node is equal to ½ of the height, a model numbered 3 is used; or if a width of the picture region corresponding to the node is less than ½ of the height, a model numbered 4 is used.

A method for selecting a context model of STSplitType is: If a depth of a node in the second-level coding tree is equal to 0, a model numbered 0 is selected; if a depth of the node in the second-level coding tree is equal to 1, a model numbered 1 is selected; or if a depth of the node in the second-level coding tree is greater than 1, a model numbered 2 is selected.

It should be understood that the numbers of the foregoing context models are merely used to distinguish between different context models, and the numbers of the context models are not limited to being the same as the numbers in the foregoing examples.

TABLE 7

| | Descriptor |
|---|---|
| coding_second_tree( x0, y0, log2CuWidth, log2CuHeight, stDepth, qtDepth) } | |
|   if( condB ) | |
|     STSplitMode[x0 ][y0 ] | ae(v) |
|     if( STSplitMode[x0 ][y0 ] ==1) } | |
|       y1 = y0 + ( 1 << ( log2CuHeight - 1 ) ) | |
|       coding_second_tree(x0, y0, log2CuWidth, log2CuHeight1, stDepth+1, qtDepth) | |
|       coding_second_tree(x0, y1, log2CuWidth, log2CuHeight1, stDepth+1, qtDepth) | |
|     } | |
|     else if(STSplitMode [x0 ][y0 ] == 2) } | |
|       x1=x0 + (1 << ( log2CuWidth - 1 ) ) | |
|       coding_second_tree(x0, y0, log2CuWidth 1, log2CuHeight, stDepth+1, qtDepth) | |
|       coding_second_tree(x1, y0, log2CuWidth1, log2CuHeight, stDepth+1, qtDepth) | |
|     } | |
|     else if(STSplitMode [x0 ][ y0 ] == 3) { | |
|       y1 = y0 + ( 1 << ( log2CuHeight - 2 ) ) | |
|       y2 = y1 + ( 1 << ( log2CuHeight - 1 ) ) | |
|     coding_unit (x0, y0, log2CuWidth, log2CuHeight2, stDepth+1, qtDepth) | |
|     coding_unit (x0, y0, log2CuWidth,log2CuHeight1,stDepth+1, qtDepth) | |
|     coding_unit (x0, y2, log2CuWidth, log2CuHeight2, stDepth+1, qtDepth) | |
|     } | |
|     else if(STSplitMode [ x0 ][ y0 ] == 4) { | |
|       x1 = x0 + ( 1 << ( log2CuWidth - 2 ) ) | |
|       x2 = x1 + ( 1 << ( log2CuWidth - 1 ) ) | |
|     coding_unit (x0, y0, log2CuWidth 2, log2CuHeight, stDepth+1, qtDepth) | |
|     coding_unit (x1, y0, log2CuWidth 1, log2CuHeight, stDepth+1, qtDepth) | |
|     coding_unit (x2, y0, log2CuWidth 2, log2CuHeight, stDepth+1, qtDepth) | |
|     } | |
|     else | |
|       coding_unit (x0, y0, log2CuWidth, log2CuHeight, stDepth, qtDepth) | |
|   } | |

S604. The decoder device decodes and reconstructs a coding unit based on encoding information of three child nodes of the first node, to obtain a picture corresponding to the picture data.

A process of decoding and reconstructing the coding unit includes processing such as prediction, dequantization, inverse transform, and loop filtering. Specifically, a process of decoding and reconstructing each coding unit includes the following steps:

(1) An intra-prediction or inter-prediction is selected based on a prediction mode included in the encoding information of the CU to obtain a predicted pixel of the CU.

(2) If the CU includes a transformation coefficient, dequantization and inverse transformation are performed on the transformation coefficient of the CU based on a quantization parameter and a transformation mode, to obtain a reconstructed residual of the CU; or if the CU does not include a transformation coefficient, a reconstructed residual of the CU is 0, in other words, a reconstructed residual value of each pixel in the CU is 0.

(3) After the predicted pixel of the CU and the reconstructed residual of the CU are added, loop filtering processing is performed to obtain a reconstructed picture block of the CU.

The encoder device decodes and reconstructs each coding unit according to the foregoing method to obtain a reconstructed picture block of each CU. After obtaining the reconstructed picture block of each CU, the encoder device obtains a final reconstructed picture based on all reconstructed picture blocks that are obtained, that is, obtains the picture corresponding to the picture data.

In this embodiment of this application, the split mode corresponding to the first node of the second-level coding tree is one of split modes determined according to the first preset split condition, the first preset split condition is used to indicate whether to restrict that the first node is split in the target split mode, and the target split mode includes at least one of the horizontal binary split, the horizontal ternary split, the vertical binary split, and the vertical ternary split. A quantity of split modes corresponding to the first node is reduced with the first preset split condition, effectively reducing decoding complexity.

In the embodiment shown in FIG. 6, in a process of determining the node split mode information of the second-level coding tree, the decoder device may sequentially determine the first information, the second information, and the third information. The decoder device in this embodiment of this application may further determine the node split mode information of the second-level coding tree in a sequence of the first information, the third information, and the second information. This scenario is described now.

In an example, in S602, the decoder device may further determine the first information, the third information, and the second information sequentially according to the parsing method shown in Table 8, to obtain the node split mode information of the second-level coding tree based on the mapping mode shown in Table 3.

Table 8 is similar to Table 2. Details are not described herein again.

Similar to that in Table 2, modes for parsing out the first information, the third information, and the second information that correspond to several candidate-split-mode sets in the 15 candidate-split-mode sets shown in Table 8 are the same or similar. Therefore, the several candidate-split-mode sets may be further combined into one category, and one parsing method is used for each category. In this case, a method for parsing out the first information, the third information, and the second information is equivalent to a parsing method for determining the first information, the third information, and the second information according to Table 8, but there are fewer determining branches.

For example, the decoder device may determine the first information STSplitFlag based on the parsing mode shown in Table 4, determine the third information STSplitType based on the parsing mode shown in Table 9, and determine the second information STSplitDir based on the parsing mode shown in Table 10.

TABLE 8

| Candidate-split-mode set | Split mode | | | | STSplitFlag | STSplitType (STSplitFlag == 1) | STSplitDir (STSplitFlag == 1) |
|---|---|---|---|---|---|---|---|
| | HBT | VBT | HTT | VTT | | | |
| 1 | 1 | 1 | 1 | 1 | a | c | b |
| 2 | 0 | 1 | 1 | 1 | a | c | STSplitType? b: NA(1) |
| 3 | 1 | 0 | 1 | 1 | a | c | STSplitType? b: NA(0) |
| 4 | 1 | 1 | 0 | 1 | a | c | !STSplitType? b: NA(1) |
| 5 | 1 | 1 | 1 | 0 | a | c | !STSplitType? b: NA(0) |
| 6 | 1 | 1 | 0 | 0 | a | NA(0) | b |
| 7 | 1 | 0 | 1 | 0 | a | c | NA(0) |
| 8 | 0 | 1 | 0 | 1 | a | c | NA(1) |
| 9 | 1 | 0 | 0 | 1 | a | c | !STSplitType? NA(0) : NA(1) |
| 10 | 0 | 1 | 1 | 0 | a | c | STSplitType? NA(0) : NA(1) |
| 11 | 1 | 0 | 0 | 0 | a | NA(0) | NA(0) |
| 12 | 0 | 1 | 0 | 0 | a | NA(0) | NA(1) |
| 13 | 0 | 0 | 1 | 0 | a | NA(1) | NA(0) |
| 14 | 0 | 0 | 0 | 1 | a | NA(1) | NA(1) |
| 15 | 0 | 0 | 0 | 0 | NA(0) | NA(0) | NA(0) |

TABLE 9

| | NumType == 2 | | | |
|---|---|---|---|---|
| | NumType >=3 | (HBT && VBT) | (HBT && HTT) \|\| (VBT && VTT) \|\| (HBT && VTT) \|\| (VBT && HTT) | NumType == 1 | NumType == 0 |
| STSplitType | c | NA(0) | c | NA (HBT \|\| VBT) | NA(0) |

TABLE 10

| | NumType == 3 | | | | | |
|---|---|---|---|---|---|---|
| | NumType == 4 | NumType == 0 | (!HBT \|\| !VBT) && STSplitType | (!HTT \|\| !NTT) && !STSplitType | (!HBT \|\| !VBT) && !STSplitType | (!HTT \|\| !NTT) && STSplitType |
| STSplitDir | b | NA(0) | b | b | NA(VBT) | NA(VTT) |
| | NumType == 1 | NumType == 2 (!HTT && !VTT) | (HBT && HTT) \|\| (VBT && VTT) | (HBT && VTT) | (VBT && HTT) | |
| STSplitDir | NA(HTT \|\| VTT) | b | NA(VBT) | NA(STSplit Type) | NA(!STSplit Type) | |

As can be seen, regardless of whether the decoder device determines the node split mode information of the second-level coding tree in the sequence of the first information, the second information, and the third information, or determines the node split mode information of the second-level coding tree in the sequence of the first information, the third information, and the second information, the decoder device can perform fast decoding with a function of the first preset split condition, and decoding complexity is relatively low.

In the foregoing embodiment, the split mode corresponding to the first-level coding tree includes the quadtree split, and the node split mode corresponding to the second-level coding tree includes the binary tree split and the ternary tree split. In an actual application, the split mode corresponding to the second-level coding tree may further include the quadtree split. In this case, the decoder device needs to determine, according to the first preset split condition and a second preset split condition, the candidate-split-mode set corresponding to the first node, to determine the split mode corresponding to the first node.

Figure 7:
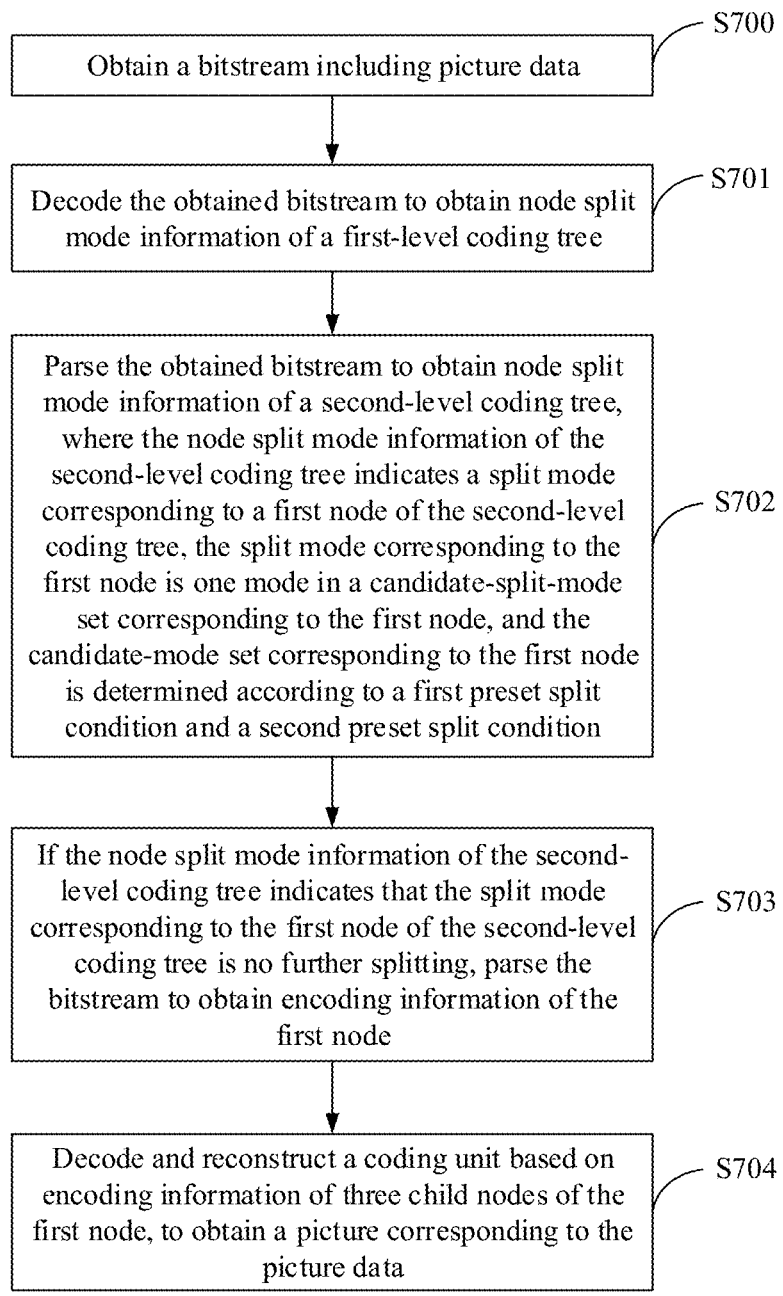
FIG. 7 is a second schematic flowchart of a picture data decoding method according to an embodiment of this application.

As shown in FIG. 7, in this scenario, the picture data decoding method provided in this embodiment of this application includes the following steps.

S700. A decoder device obtains a bitstream including picture data.

For S700, refer to the foregoing description in S600. Details are not described herein.

S701. The decoder device decodes the bitstream obtained by the decoder device, to obtain node split mode information of a first-level coding tree.

For S701, refer to the foregoing description of S601. Details are not described herein again.

S702. The decoder device parses the bitstream obtained by the decoder device, to obtain node split mode information of a second-level coding tree.

The node split mode information of the second-level coding tree indicates a split mode corresponding to a first node of the second-level coding tree, the split mode corresponding to the first node is one mode in a candidate-split-mode set corresponding to the first node, the candidate-split-mode set corresponding to the first node is determined according to a first preset split condition and a second preset split condition, the first preset split condition is used to indicate whether to restrict that the first node is split in the target split mode, the target split mode includes at least one of horizontal binary split, horizontal ternary split, vertical binary split, and vertical ternary split, and the second preset split condition is used to indicate whether to restrict that the first node is split based on the quadtree split.

A root node of the second-level coding tree is a leaf node of the first-level coding tree. The node split mode corresponding to the second-level coding tree is different from the node split mode corresponding to the first-level coding tree. In this embodiment, the node split mode corresponding to the second-level coding tree includes binary tree split, ternary tree split, and the quadtree split, the binary tree split includes the horizontal binary split and the vertical binary split, and the ternary tree split includes the horizontal ternary split and the vertical ternary split.

Different from that in S602, the decoder device in this embodiment needs to determine, according to the first preset split condition and the second preset split condition, the candidate-split-mode set corresponding to the first node.

The first preset split condition is the same as the first preset split condition in the embodiment shown in FIG. 6. Herein, the second preset split condition may include at least one of the following preset split sub-conditions:

a tenth preset split sub-condition: If a depth of the first node in the second-level coding tree is less than a preset maximum depth in the second-level coding tree, the candidate-split-mode set corresponding to the first node does not include the quadtree split; and an eleventh preset split sub-condition: If the width-to-height ratio of the picture region corresponding to the first node is greater than or equal to a fifth preset threshold, the candidate-split-mode set corresponding to the first node does not include the quadtree split.

Similar to that in S602, the decoder device in this embodiment first determines, according to the first preset split condition and the second preset split condition, the candidate-split-mode set corresponding to the first node, and then parses the bitstream in the split mode corresponding to the first node, to determine the node split mode information corresponding to the second-level coding tree.

Because the node split mode corresponding to the second-level coding tree in this embodiment further includes the quadtree split, in this embodiment, based on the description in FIG. 6, a numeric value of a fourth identifier (STSplitMode) may also be 5, that is, STSplitMode=5, indicating that a split mode that corresponds to a node corresponding to the fourth identifier is the quadtree split.

Correspondingly, the fourth identifier in this embodiment further includes fourth information (the fourth information in this specification is represented by STQTSplitFlag), and the fourth information is used to indicate whether to split the first node based on the quadtree split. In other words, the fourth identifier in this embodiment includes first information, second information, third information, and the fourth information. In this embodiment, if a numeric value of STQTSplitFlag is equal to 1, it indicates that the split mode that corresponds to the node corresponding to the fourth identifier includes the quadtree split; or if a numeric value of STQTSplitFlag is equal to 0, it indicates that a candidate-split-mode set that corresponds to the node corresponding to the fourth identifier does not include the quadtree split.

Specifically, the decoder device determines the first information, the second information, the third information, and the fourth information sequentially, to determine the node split mode information corresponding to the second-level coding tree.

Similar to that in the embodiment in FIG. 6, the decoder device in this embodiment may determine the first information based on the first numeric value and content of the fourth information in the embodiment in FIG. 6, to determine the second information and the third information.

For example, the decoder device may determine the first information STSplitFlag in the parsing mode shown in Table 11, and determine the fourth information STQTSplitFlag in the parsing mode shown in Table 12. In Table 11, if a numeric value of the QT is 1, it indicates that the first node is split in the QT split mode; or if a numeric value of the QT is 0, it indicates that splitting the first node in the QT split mode is not allowed. When "NumType>0∥QT" is met, the decoder device parses out STSplitFlag from the bitstream; otherwise (that is, "NumType==0 && !QT" is met), a numeric value of STSplitFlag is 0 by default. If a numeric value of STSplitFlag is 1, the decoder device continues to parse STQTSplitFlag; otherwise, numeric values of STQTSplitFlag, STSplitDir, and STSplitType are all 0 by default.

It can be known from Table 12, when the split mode corresponding to the first node includes the quadtree split, the decoder device parses out STQTSplitFlag from the bitstream; otherwise, a numeric value of STQTSplitFlag is 0 by default. If the numeric value of STQTSplitFlag is 0, STSplitDir and STSplitType continue to be parsed out sequentially; otherwise, numeric values of STSplitDir and STSplitType are 0 by default.

In this embodiment, modes of parsing STSplitDir and STSplitType are the same as modes of parsing STSplitDir and STSplitType in the embodiment in FIG. 6. Details are not described herein again.

TABLE 11

| | NumType > 0 ∥ QT | NumType == 0 && !QT |
|---|---|---|
| STSplitFlag | a | NA(0) |

TABLE 12

| | QT | !QT |
|---|---|---|
| STQTSplitFlag | a | NA(0) |

After determining the numeric values of STSplitFlag, STSplitDir, STSplitType, and STQTSplitFlag, the decoder device may determine the fourth identifier STSplitMode based on the four numeric values, that is, determine the split mode information of the first node of the second-level coding tree.

For example, the decoder device determines a numeric value of STSplitMode based on the numeric values of STSplitFlag, STSplitDir, STSplitType, and STQTSplitFlag in a mapping mode shown in Table 13.

TABLE 13

| STSplitMode | STSplitFlag | STQTSplitFlag | STSplitDir | STSplitType |
|---|---|---|---|---|
| 0 | 0 | 0 | 0 | 0 |
| 1 | 1 | 0 | 0 | 0 |
| 2 | 1 | 0 | 1 | 0 |
| 3 | 1 | 0 | 0 | 1 |
| 4 | 1 | 0 | 1 | 1 |
| 5 | 1 | 1 | 0 | 0 |

Same as other information, STQTSplitFlag in this embodiment may also be encoded in a bypass mode, or encoded by using one or more probability models.

S703. If the node split mode information of the second-level coding tree indicates that the split mode corresponding to the first node of the second-level coding tree is no further splitting, the decoder device parses the bitstream to obtain encoding information of the first node.

For S703, refer to S603. Details are not described herein again.

S704. The decoder device decodes and reconstructs a coding unit based on encoding information of three child nodes of the first node, to obtain a picture corresponding to the picture data.

For S704, refer to S604. Details are not described herein again.

Compared with the embodiment in FIG. 6, in this embodiment, the split mode corresponding to the second-level coding tree further includes the quadtree split, and the split mode included in the candidate-split-mode set corresponding to the first node is further restricted. In this way, decoding efficiency of the decoder device can be further improved.

In addition, an embodiment of this application further provides a picture data encoding method. The encoding method may be applied to the picture processing system shown in FIG. 4.

Figure 8:
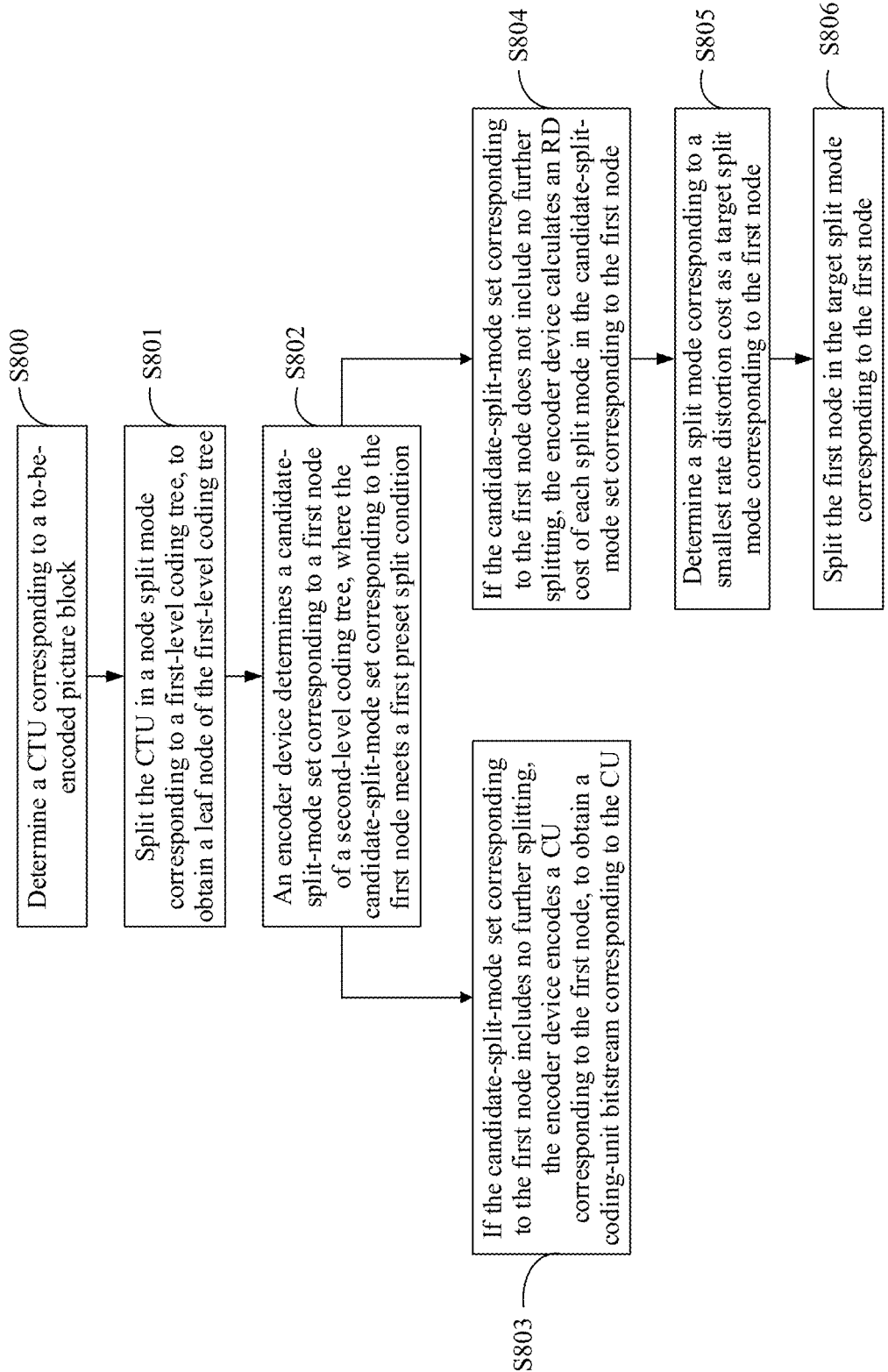
FIG. 8 is a schematic flowchart of a picture data encoding method according to an embodiment of this application.

As shown in FIG. 8, the picture data encoding method provided by this embodiment of this application includes the following steps.

S800. An encoder device determines a CTU corresponding to a to-be-encoded picture block.

It can be known from the foregoing descriptions that, a picture includes a plurality of CTUs, and one CTU usually corresponds to one square picture region. After obtaining a picture, the encoder device encodes each CTU of the picture.

Processes of encoding all CTUs by the encoder device are the same. Therefore, description is provided in this embodiment of this application by using an example in which the encoder device encodes one CTU.

S801. The encoder device splits the CTU in a node split mode corresponding to a first-level coding tree, to obtain a leaf node of the first-level coding tree.

A root node of the first-level coding tree corresponds to the CTU, and the node split mode corresponding to the first-level coding tree is quadtree split.

Specifically, the encoder device determines the CTU as the root node of the first-level coding tree, and recursively splits the CTU into at least one leaf node in the QT split mode.

After obtaining the at least one leaf node of the first-level coding tree, the encoder device determines each leaf node of the first-level coding tree as a root node of a second-level coding tree, and sequentially performs the following steps on each root node of the second-level coding tree, until information about all leaf nodes of the second-level coding tree is obtained. Description is provided in this embodiment of this application by using an example in which the encoder device processes a first node of the second-level coding tree.

S802. The encoder device determines a candidate-split-mode set corresponding to the first node of the second-level coding tree, where the candidate-split-mode set corresponding to the first node meets a first preset split condition.

The first preset split condition is used to indicate whether to restrict that the first node is split in a target split mode, a root node of the second-level coding tree is a leaf node of the first-level coding tree, and the target split mode includes at least one of horizontal binary split, horizontal ternary split, vertical binary split, and vertical ternary split.

Generally, when there is no constraint for splitting of the first node, split modes available for the first node include no further splitting, horizontal binary split, horizontal ternary split, vertical binary split, vertical ternary split, and quadtree split. In this case, the encoder device needs to calculate RD costs of the six split modes sequentially, causing relatively high encoding complexity.

This embodiment of this application proposes the first preset split condition for limiting the split mode available for the first node. The first preset split condition is the same as the first preset split condition described in the embodiment shown in FIG. 6. Details are not described herein again.

A quantity of split modes included in the candidate-split-mode set corresponding to the first node is limited with the first preset split condition. In this way, the encoder device does not need to calculate the RD costs of the six split modes for the first node in most cases, reducing encoding complexity.

S803. If the candidate-split-mode set corresponding to the first node includes no further splitting, the encoder device encodes a CU corresponding to the first node, to obtain a coding-unit bitstream corresponding to the CU.

If the candidate-split-mode set corresponding to the first node includes no further splitting, it indicates that the first node is a leaf node of the second-level coding tree, and the first node corresponds to one CU. The encoder device encodes the CU corresponding to the first node, to obtain the coding-unit bitstream corresponding to the CU.

Specifically, CU encoding includes procedures such as prediction (prediction), transform (transform), quantization (quantization), and entropy coding (entropy coding). For a CU, a process in which the encoder device encodes the CU to obtain a CU bitstream corresponding to the CU mainly includes the following steps:

(1) The encoder device selects intra-prediction or inter-prediction based on a prediction mode to obtain a predicted pixel of the CU.

(2). The encoder device changes and quantizes a residual between an original pixel of the CU and the predicted pixel of the CU to obtain a transform coefficient, and performs dequantization and inverse transform processing on the obtained transform coefficient to obtain a reconstructed residual of the CU.

(3) After adding the predicted pixel of the CU and the reconstructed residual of the CU, the encoder device performs loop filtering processing to obtain a reconstructed pixel of the CU.

(4) The encoder device performs entropy coding on information such as the prediction mode and the transform coefficient of the CU to obtain the CU bitstream.

For a detailed process in which the encoder device encodes the CU to obtain the CU bitstream of the CU, refer to an existing CU bitstream generation method, and details are not described herein again.

S804. If the candidate-split-mode set corresponding to the first node does not include no further splitting, the encoder device calculates an RD cost of each split mode in the candidate-split-mode set corresponding to the first node.

For a candidate-split-mode in the candidate-split-mode set corresponding to the first node, the encoder device splits the first node in this split mode, and obtains all CUs obtained after the first node is split in this split mode. The encoder device calculates an RD cost of each CU, and determines a sum of RD costs of all the CUs as an RD cost of this split mode.

Optionally, for any CU, an RD cost of the CU is equal to a weighted sum of a sum of squared errors (Sum of Squared Errors, SSE) of reconstruction distortion of pixels included in the CU and an estimated value of a quantity of bits in the bitstream corresponding to the CU.

S805. The encoder device determines a split mode corresponding to a smallest rate distortion cost as a target split mode corresponding to the first node.

S806. The encoder device splits the first node in the target split mode corresponding to the first node.

After splitting the first node in the target split mode corresponding to the first node, the encoder device sequentially performs S802 to S806 on each child node of the first node until all leaf nodes of the second-level coding tree are obtained.

Each leaf node of the second-level coding tree corresponds to one CU. After obtaining all the leaf nodes of the second-level coding tree, the encoder device may obtain a CU corresponding to each leaf node of the second-level coding tree. It can be known from S803 that, the encoder device may encode a CU to obtain a CU bitstream corresponding to the CU. Therefore, the encoder device may obtain at least one CU bitstream. In this way, the encoder device can obtain a CTU bitstream based on the at least one CU bitstream, node split mode information corresponding to the first-level coding tree, and node split mode information corresponding to the second-level coding tree, to generate a bitstream including picture data.

Further, the encoder device in this embodiment of this application may further determine, according to a second preset split condition, the candidate-split-mode set corresponding to the first node.

Herein, the second preset split condition may include at least one of the following preset split sub-conditions:

A tenth preset split sub-condition: If a depth of the first node in the second-level coding tree is less than a preset maximum depth in the second-level coding tree, the candidate-split-mode set corresponding to the first node does not include the quadtree split.

An eleventh preset split sub-condition: If the width-to-height ratio of the picture region corresponding to the first node is greater than or equal to a fifth preset threshold, the candidate-split-mode set corresponding to the first node does not include the quadtree split.

In this embodiment of this application, splitting of a node of the second-level coding tree is limited by the first preset condition. In this way, complexity of splitting a node of a second-level coding tree is greatly reduced, and encoding complexity is reduced.

An embodiment of this application provides a decoder device. The decoder device is configured to perform the steps performed by the decoder device in the foregoing picture data decoding method. The decoder device provided by this embodiment of this application may include modules corresponding to corresponding steps.

In this embodiment of this application, division of functional modules of the decoder device may be performed according to the example in the foregoing method. For example, division of the functional modules may be performed in correspondence to functions, or two or more functions may be integrated into one processing module. The integrated module may be implemented in a form of hardware, or may be implemented in a form of a software functional module. In this embodiment of this application, module division is an example and is merely logical function division, and may be other division in actual implementation.

Figure 9:
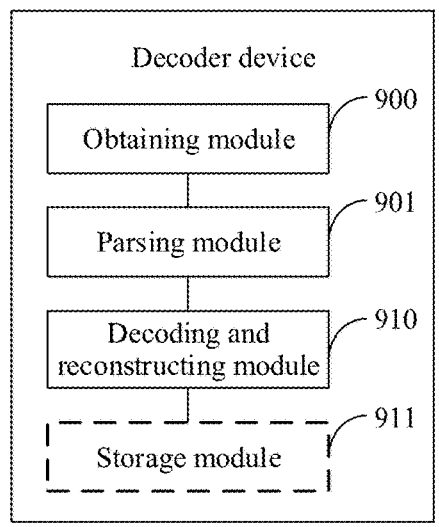
FIG. 9 is a schematic structural diagram of a decoder device according to an embodiment of this application.

When division of the functional modules is performed in correspondence to the functions, FIG. 9 is a possible schematic structural diagram of the terminal device in the foregoing embodiment. As shown in FIG. 9, the decoder device includes an obtaining module 900, a parsing module 901, and a decoding and reconstructing module 910. The obtaining module 900 is configured to support the decoder device in performing S600, S700, and/or the like in the foregoing embodiments, and/or is configured to perform another process of the technology described in this specification. The parsing module 901 is configured to support the decoder device in performing S601, S602, S603, S701, S702, S703, and/or the like in the foregoing embodiments, and/or is configured to perform another process of the technology described in this specification. The decoding and reconstructing module 910 is configured to support the decoder device in performing S604, S704, and/or the like in the foregoing embodiments, and/or is configured to perform another process of the technology described in this specification. All related content of the steps in the foregoing method embodiments may be cited in function descriptions of corresponding function modules, and details are not described herein again. Certainly, the decoder device provided by this embodiment of this application includes but is not limited to the foregoing modules. For example, the decoder device may further include a storage module 911. The storage module 911 may be configured to store program code and data of the decoder device.

When an integrated unit is used, the parsing module 901 and the decoding and reconstructing module 910 in this embodiment of this application may be the processor 57 in FIG. 5, the obtaining module 900 may be the RF circuit 50 in FIG. 5 and an antenna connected to the RF circuit 50, and the storage module 911 may be the memory 51 in FIG. 5.

When the decoder device runs, the decoder device performs the picture data decoding method in the embodiment shown in FIG. 6 or FIG. 7. For the specific picture data decoding method, refer to related descriptions in the foregoing embodiment shown in FIG. 6 or FIG. 7. Details are not described herein again.

Another embodiment of this application further provides a computer readable storage medium. The computer readable storage medium includes one or more groups of program, and the one or more programs include an instruction. When a processor in a decoder device executes the program code, the decoder device performs the picture data decoding method shown in FIG. 6 or FIG. 7.

Another embodiment of this application further provides a computer program product. The computer program product includes a computer executable instruction, and the computer executable instruction is stored in a computer readable storage medium. When at least one processor of a decoder device can read the computer executable instruction from the computer readable storage medium, the at least one processor executes the computer executable instruction, so that the decoder device performs steps of a decoder device in the picture data decoding method shown in FIG. 6 or FIG. 7.

An embodiment of this application provides an encoder device. The encoder device is configured to perform the steps performed by the encoder device in the foregoing picture data encoding method. The encoder device provided by this embodiment of this application may include modules corresponding to corresponding steps.

In this embodiment of this application, division of functional modules may be performed on the encoder device according to the example in the foregoing method. For example, division of the functional modules may be performed in correspondence to functions, or two or more functions may be integrated into one processing module. The integrated module may be implemented in a form of hardware, or may be implemented in a form of a software functional module. In this embodiment of this application, module division is an example and is merely logical function division, and may be other division in actual implementation.

Figure 10:
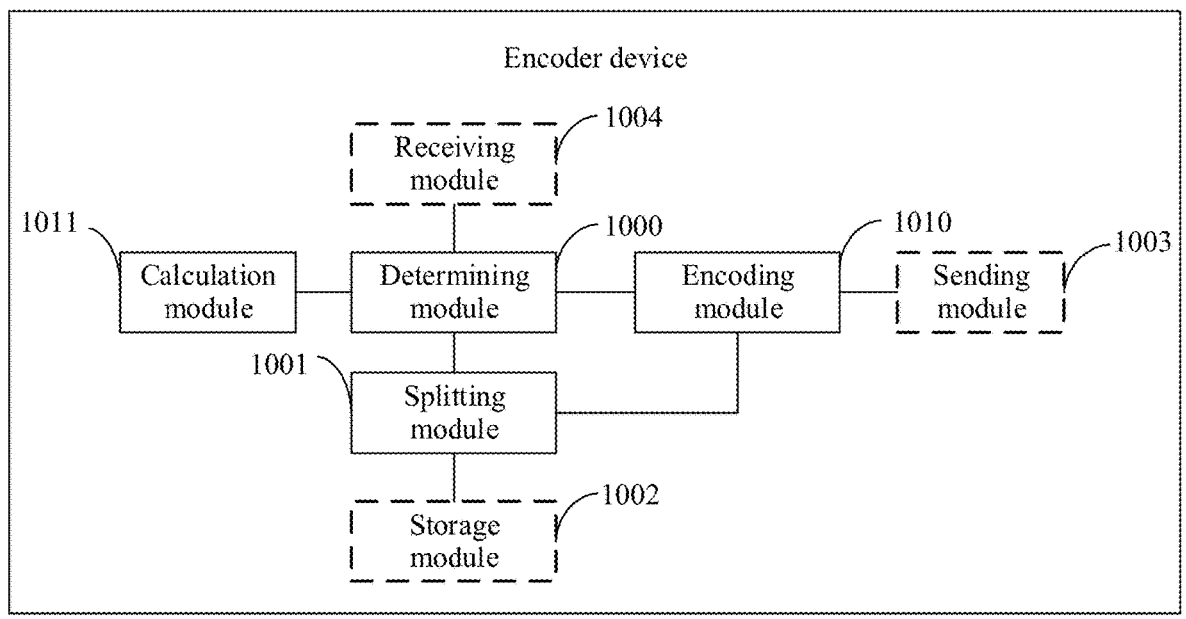
FIG. 10 is a schematic structural diagram of an encoder device according to an embodiment of this application.

When division of the functional modules is performed in correspondence to the functions, FIG. 10 is a possible schematic structural diagram of the terminal device in the foregoing embodiment. As shown in FIG. 10, the encoder device includes a determining module 1000, a splitting module 1001, an encoding module 1010, and a calculation module 1011. The determining module 1000 is configured to support the encoder device in performing S800, S802, S805, and/or the like in the foregoing embodiment, and/or perform another process in the technology described in this specification. The splitting module 1001 is configured to support the encoder device in performing S801, S806, and/or the like in the foregoing embodiment, and/or perform another process in the technology described in this specification. The encoding module 1010 is configured to support the encoder device in performing S803 in the foregoing embodiment, and/or perform another process in the technology described in this specification. The calculation module 1011 is configured to support the encoder device in performing S804 in the foregoing embodiment, and/or perform another process in the technology described in this specification. All related content of the steps in the foregoing method embodiment may be cited in function descriptions of corresponding function modules, and details are not described herein again. Certainly, the encoder device provided by this embodiment of this application includes but is not limited to the foregoing modules. For example, the encoder device may further include a storage module 1002, a sending module 1003, and a receiving module 1004. The storage module 1002 may be configured to store program code and data of the encoder device. The sending module 1003 and the receiving module 1004 are configured to communicate with another device.

When an integrated unit is used, the determining module 1000, the splitting module 1001, the encoding module 1010, and the calculation module 1011 in this embodiment of this application may be the processor 57 in FIG. 5, the sending module 1003 and the receiving module 1004 may be the RF circuit 50 in FIG. 5 and an antenna connected to the RF circuit 50, and the storage module 1002 may be the memory 51 in FIG. 5.

When the encoder device runs, the encoder device performs the picture data decoding method in the embodiment shown in FIG. 8. For the specific picture data decoding method, refer to related descriptions in the foregoing embodiment shown in FIG. 8. Details are not described herein again.

Another embodiment of this application further provides a computer readable storage medium. The computer readable storage medium includes one or more groups of program code, and the one or more programs include an instruction. When a processor in an encoder device executes the program code, the encoder device performs the picture data encoding method shown in FIG. 8.

In another embodiment of this application, a computer program product is further provided. The computer program product includes a computer executable instruction, and the computer executable instruction is stored in a computer readable storage medium. At least one processor of an encoder device may read the computer executable instruction from the computer readable storage medium, and the at least one processor executes the computer executable instruction, so that the encoder device performs steps of the encoder device in the picture data decoding method shown in FIG. 8.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions are generated according to the embodiments of this application. The computer may be a general-purpose computer, a special-purpose computer, a computer network, or another programmable apparatus. The computer instructions may be stored in a computer-readable storage medium or may be transmitted from a computer-readable storage medium to another computer-readable storage medium, for example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk, (SSD)), or the like.

With descriptions of the foregoing implementations, a person skilled in the art may clearly understand that, for convenience and brevity of description, the division of the foregoing functional modules is merely used as an example for description. In actual application, the foregoing functions may be allocated to different functional modules for implementation as required, that is, an internal structure of the apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division of the modules or units is merely logical function division, and may be other division in actual implementation. For example, a plurality of units or components may be combined or integrated into another apparatus, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and components displayed as units may be one or more physical units, in other words, the components may be located in one place, or may be distributed in different places. Some or all of the units may be selected depending on actual needs to achieve the objectives of the solutions of the embodiments.

In addition, functional units in the embodiments of this application may be integrated into one processing unit, or each nit may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium, several instructions are included, so that a device (which may be a single-chip microcomputer, a chip, or the like) or the processor (processor) performs all or some of the steps of the methods described in the embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, and a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method of picture data decoding, comprising:
   obtaining a bitstream comprising picture data;
   parsing the bitstream to obtain node split mode information of a first-level coding tree, wherein a root node of the first-level coding tree corresponds to a coding tree unit (CTU), and the size of the CTU is 128×128, and a sub-node of the first-level coding tree is determined based on the root node of the first-level coding tree and a node split mode corresponding to the node split mode information of the first-level coding tree, wherein the node split mode information of the first-level coding tree indicates a quadtree split mode;
   parsing the bitstream to obtain node split mode information of a second-level coding tree, wherein the node split mode information of the second-level coding tree indicates a horizontal ternary split mode or a vertical ternary split mode used to split a first node of the second-level coding tree, and a root node of the second-level coding tree is the sub-node of the first-level coding tree;
   splitting the first node of the second-level coding tree into three child nodes using the horizontal ternary split mode or the vertical ternary split mode;
   parsing the bitstream to obtain node split mode information of a first child node of the first node, wherein a split mode of the first child node, indicated by the node split mode information of the first child node, is not a horizontal binary split mode when the first node of the second-level coding tree is split by the horizontal ternary split mode, or is not a vertical binary split mode when the first node of the second-level coding tree is split by the vertical ternary split mode;
   splitting the first child node into at least two sub-child nodes using the split mode of the first child node; and
   decoding a coding unit corresponding to a sub-child node from the at least two sub-child nodes, based on encoding information of the at least two sub-child nodes to obtain a picture corresponding to the picture data, when the sub-child node needs no further splitting.

2. The method according to claim 1, wherein an area of a picture region corresponding to the first child node is a largest area among areas of picture regions corresponding to the three child nodes.

3. The method according to claim 2, wherein a picture region corresponding to a second child node of the first node is located in the middle of the picture regions corresponding to the three child nodes.

4. A method of picture data encoding, comprising:
   determining a coding tree unit (CTU) corresponding to a to-be-encoded picture block, wherein the size of the CTU is 128×128;
   splitting the CTU in a node split mode corresponding to a first-level coding tree, to obtain a sub-node of the first-level coding tree, wherein a root node of the first-level coding tree corresponds to the CTU, wherein the node split mode corresponding to a first-level coding tree is a quadtree split mode;
   splitting a first node of a second-level coding tree into three child nodes using a horizontal ternary split mode or a vertical ternary split mode, wherein a root node of the second-level coding tree is the sub-node of the first-level coding tree;
   determining a split mode of a first child node of the first node from a candidate-split-mode set that does not comprise a horizontal binary split mode when the first node of the second-level coding tree is split by the horizontal ternary split mode, or does not comprise a vertical binary split mode when the first node of the second-level coding tree is split by the vertical ternary split mode;
   splitting the first child node into at least two sub-child nodes using the split mode of the first child node; and
   encoding a coding unit corresponding to a sub-child node from the at least two sub-child nodes, when the sub-child node needs no further splitting.

5. The method according to claim 4, wherein an area of a picture region corresponding to the first child node is a largest area among areas of picture regions corresponding to the three child nodes.

6. The method according to claim 5, wherein a picture region corresponding to a second child node is located in the middle of the picture regions corresponding to the three child nodes.

7. A decoder device, comprising:
a non-transitory memory coupled to a processor to store instructions, which when executed by the processor, cause the processor to perform operations, the operations including:
obtaining a bitstream comprising picture data;
parsing the bitstream to obtain node split mode information of a first-level coding tree, wherein a root node of the first-level coding tree corresponds to a coding tree unit (CTU), and the size of the CTU is 128×128, and a sub-node of the first-level coding tree is defined by using the root node of the first-level coding tree and a node split mode corresponding to the node split mode information of the first-level coding tree, wherein the node split mode information of the first-level coding tree indicates a quadtree split mode;
parsing the bitstream to obtain node split mode information of a second-level coding tree, wherein the node split mode information of the second-level coding tree indicates a horizontal ternary split mode or a vertical ternary split mode used to split a first node of the second-level coding tree, and a root node of the second-level coding tree is the sub-node of the first-level coding tree;
splitting the first node of the second-level coding tree into three child nodes using the horizontal ternary split mode or the vertical ternary split mode;
parsing the bitstream to obtain node split mode information of a first child node of the first node, wherein a split mode of the first child node, indicated by the node split mode information of the first child node, is not a horizontal binary split mode when the first node of the second-level coding tree is split by the horizontal ternary split mode, or is not a vertical binary split mode when the first node of the second-level coding tree is split by the vertical ternary split mode;
splitting the first child node into at least two sub-child nodes using the split mode of the first child node; and
decoding a coding unit corresponding to a sub-child node from the at least two sub-child nodes, based on encoding information of the at least two sub-child nodes to obtain a picture corresponding to the picture data, when the sub-child node needs no further splitting.

8. The decoder device according to claim 7, wherein an area of a picture region corresponding to the first child node is a largest area among areas of picture regions corresponding to the three child nodes.

9. The decoder device according to claim 8, wherein a picture region corresponding to a second child node is located in the middle of the picture regions corresponding to the three child nodes.

10. An encoder device, comprising:
a non-transitory memory coupled to a processor to store instructions, which when executed by the processor, cause the processor to perform operations, the operations including:
determining a coding tree unit (CTU) corresponding to a to-be-encoded picture block, wherein the size of the CTU is 128×128;
splitting the CTU in a node split mode corresponding to a first-level coding tree, to obtain a sub-node of the first-level coding tree, wherein a root node of the first-level coding tree corresponds to the CTU, wherein the node split mode corresponding to a first-level coding tree is a quadtree split mode;
splitting a first node of a second-level coding tree into three child nodes using a horizontal ternary split mode or a vertical ternary split mode, wherein a root node of the second-level coding tree is the sub-node of the first-level coding tree;
determining a split mode of a first child node of the first node from a candidate-split-mode set that does not comprise a horizontal binary split mode when the first node of the second-level coding tree is split by the horizontal ternary split mode, or does not comprise a vertical binary split mode when the first node of the second-level coding tree is split by the vertical ternary split mode;
splitting the first child node into at least two sub-child nodes using the split mode of the first child node; and
encoding a coding unit corresponding to a sub-child node from the at least two sub-child nodes, when the sub-child node needs no further splitting.

11. The encoder device according to claim 10, wherein an area of a picture region corresponding to the first child node is a largest area among areas of picture regions corresponding to the three child nodes.

12. The encoder device according to claim 11, wherein a picture region corresponding to a second child node is located in the middle of the picture regions corresponding to the three child nodes.

* * * * *